US012645018B2

(12) United States Patent
Hannigan et al.

(10) Patent No.: US 12,645,018 B2
(45) Date of Patent: Jun. 2, 2026

(54) OPTICAL ISOLATOR WITH OPTICAL POLARIZERS HAVING HIGH TRANSMISSION, CORROSION RESISTANCE AND REDUCED THICKNESS

(71) Applicant: II-VI Delaware, Inc., Wilmington, DE (US)

(72) Inventors: Justin M. Hannigan, Springfield, OR (US); Christoph Greiner, Eugene, OR (US); Ramesh Sundaram, Fremont, CA (US); Juan Ni, Eugene, OR (US); Victoria Sorg, Eugene, OR (US); Dmitri Iazikov, Eugene, OR (US)

(73) Assignee: II-VI Delaware, Inc., Wilmington, DE (US)

( * ) Notice: Subject to any disclaimer, the term of this patent is extended or adjusted under 35 U.S.C. 154(b) by 183 days.

(21) Appl. No.: 18/382,778

(22) Filed: Oct. 23, 2023

(65) Prior Publication Data

US 2024/0345304 A1 Oct. 17, 2024

Related U.S. Application Data

(60) Provisional application No. 63/460,184, filed on Apr. 18, 2023, provisional application No. 63/495,415, filed on Apr. 11, 2023.

(51) Int. Cl.
*G02B 5/30* (2006.01)
*G02B 1/16* (2015.01)
(Continued)

(52) U.S. Cl.
CPC ............. *G02B 5/3008* (2013.01); *G02B 1/16* (2015.01); *G02B 5/3041* (2013.01);
(Continued)

(58) Field of Classification Search
CPC ................................................... G02B 5/3008
See application file for complete search history.

(56) References Cited

U.S. PATENT DOCUMENTS 7,268,946 B2 * 9/2007 Wang ................... G02B 5/3025
359/489.08
7,813,039 B2 * 10/2010 Perkins ................ G02B 5/3058
359/485.05
(Continued)

FOREIGN PATENT DOCUMENTS

JP        2003043249 A    2/2003
JP         200493634 A    3/2004
(Continued)

*Primary Examiner* — Edmond C Lau
(74) *Attorney, Agent, or Firm* — The Webb Law Firm

(57) ABSTRACT

An optical isolator includes a polarizer for receiving an optical signal from an optical signal source, a Faraday rotator disposed on one surface of the polarizer for rotating a polarization of the optical signal output by the polarizer and outputting the same as a rotator output optical signal, and an analyzer disposed on an opposing surface of the polarizer for receiving the rotator output optical signal and for outputting at least a part thereof. The polarizer and the analyzer each include a number of spaced elongated dielectric ridges. Each dielectric ridge has a length direction extending along the one surface of the Faraday rotator, pair of spaced sides that extend away from the one surface of the Faraday rotator and a top extending between the spaced sides opposite the one surface of the Faraday rotator. Each dielectric ridge includes an electrically conductive coating on each side of the dielectric ridge.

15 Claims, 17 Drawing Sheets

(51) Int. Cl.
    *G02F 1/095*           (2006.01)
    *G02F 1/165*           (2019.01)

(52) U.S. Cl.
    CPC ......... *G02B 5/3058* (2013.01); *G02F 1/0955*
          (2013.01); *G02F 1/165* (2019.01); *G02F*
    *2201/063* (2013.01); *G02F 2202/10* (2013.01);
          *G02F 2202/28* (2013.01)

(56)          References Cited

U.S. PATENT DOCUMENTS

2002/0191880 A1* 12/2002  Borrelli ................ G02B 6/2746
                                      385/11
2017/0315281 A1* 11/2017  Suto ......................... G02B 5/32

FOREIGN PATENT DOCUMENTS

JP         2016536651 A    11/2016
WO        2015060939 A1    4/2015

* cited by examiner

OPTICAL ISOLATOR WITH OPTICAL POLARIZERS HAVING HIGH TRANSMISSION, CORROSION RESISTANCE AND REDUCED THICKNESS

CROSS-REFERENCE TO RELATED APPLICATION

This application claims the benefit of U.S. Provisional Patent Application No. 63/495,415, filed Apr. 11, 2023, and U.S. Provisional Patent Application No. 63/460,184, filed Apr. 18, 2023, the contents of both of which are incorporated herein by reference.

BACKGROUND

1. Field

The present disclosure relates to optical polarizers with minimized absorptive losses, improved corrosion resistance and reduced thickness, and optical isolators that include said optical polarizers.

2. Description of Related Art

With reference to FIG. 1, an exemplary prior art wire grid polarizer includes a periodic pattern of aluminum (Al) polarizer lines or conductive ridges positioned or disposed on a surface of a substrate (S) that is suitably transparent at a wavelength of operation ($\lambda$) of the polarizer. The polarizer period ($\Lambda$) is chosen to be $\Lambda < \lambda/n$ (for normal incidence), where $n > 1$ is the substrate refractive index, or smaller for non-normal incidence. In this limit, no diffraction into the substrate or the ambient medium occurs.

In the example of FIG. 1, the polarizer period $\Lambda$ of the Al lines may be 300 nm for an operational wavelength of 1.3 um to 1.5 um. The substrate material may be fused silica (n=1.45), the Al line height (h) may be 500±60 nm and the Al line linewidth (W) may be 114±24 nm. The polarizer of FIG. 1 operates by passing a beam of light (traversing from bottom to top or vice versa in FIG. 1), at or close to the operational wavelength range, with an electric field orientation or vector perpendicular to the conductive ridges and reflecting at least parts of the passing light beam with an electric field orientation or vector orthogonal, but not perpendicular, to the conductive ridges, e.g., with an electric field orientation or vector parallel to the conductive ridges. The ratio of power transmitted for parallel polarized light to power transmitted for perpendicularly polarized light is called the extinction ratio (ER) or contrast. Besides ER, the polarizer transmission or transmissivity (T) for perpendicularly polarized light (polarizer pass direction) is also a parameter used to characterize polarizer performance. The exemplary polarizer of FIG. 1 may achieve an ER=66 dB at the central wavelength of 1310 nm and a transmissivity of T=93%.

Herein, the duty cycle (DC) of a polarizer may be a ratio of the linewidth (W) divided by the period $\Lambda$, i.e., DC=w/$\Lambda$. It has been determined that in the polarizer of FIG. 1, areas of high transmissivity, e.g., T>98%, and high extinction ratio, e.g., ER>50 dB, are mutually exclusive. Moreover, in the polarizer of FIG. 1, the polarizer's (absorptive) loss may be defined as 1−(R+T), where R denotes the fraction of incident light lost to reflection from the polarizer surface. In regions of the polarizer of FIG. 1 having a high ER (>50 dB) and for wire cross sections maintaining a manufacturable aspect ratio (defined as linewidth (w) divided by line height (h)) of less than 1:4, the polarizer's transmission or transmissivity (T) is limited by reflection and absorption loss to less than approximately 95%. While the reflection loss can be reduced by incorporating additional layers cancelling reflections, the absorption loss is fundamentally limiting to the polarizer's transmission or transmissivity (T).

In the polarizer of FIG. 1, the polarizer's loss increases as the extinction ratio (ER) increases and is proportional to duty cycle, i.e., DC=w/$\Lambda$, and line height (h), i.e., ultimately to the metal volume in the light beam path. In many applications requiring polarizers, both high extinction ratio (ER) and high transmissivity (T) as possible are desired. An example of such a requirement would be a polarizer with T>98.5% and ER>50 dB. The prior art polarizer of FIG. 1, when requiring manufacturable dimensions, cannot achieve this level of performance. The present disclosure describes polarizers that can provide for both high transmissivity (T) and extinction ratio (ER) as loss is reduced.

SUMMARY

Disclosed herein is an optical polarizer including a dielectric substrate and a plurality of elongated dielectric ridges positioned or disposed in spaced relation on a surface of the dielectric substrate. Each dielectric ridge has a length direction, curved or straight, that extends along the surface of the substrate and each dielectric ridge includes a pair of spaced sides that extend away from, e.g., transverse or perpendicular, the surface of the substrate and a top extending between the spaced sides opposite the surface of the substrate. Each side of each dielectric ridge includes an electrically conductive coating.

The optical polarizer may include a groove or trench between the electrically conductive coatings on the facing sides of adjacent or proximate pairs of dielectric ridges. A dielectric may be disposed in at least each groove or trench between the facing sides of the adjacent or proximate pairs of dielectric ridges. The dielectric disposed in the at least each groove or trench may also cover the tops of the plurality of elongated dielectric ridges.

The dielectric substrate may be a multi-layer dielectric substrate. A spacing between the plurality of elongated dielectric ridges including the electrically conductive coating on each side of each dielectric ridge may be one of: constant or variable/chirped.

The optical polarizer may include a layer of electrically conductive strips positioned or disposed between the dielectric substrate and the plurality of dielectric ridges parallel with the length directions of the dielectric ridges and/or a layer of electrically conductive strips positioned or disposed above the plurality of dielectric ridges parallel with the length directions of the dielectric ridges.

The optical polarizer may include a pair of layers of electrically conductive strips positioned or disposed, one above the other, above the tops of the plurality of dielectric ridges; and a second plurality of elongated dielectric ridges, including on each side of each dielectric ridge of the second plurality of elongated dielectric ridges an electrically conductive coating, positioned or disposed between the pair of layers of electrically conductive strips.

Also disclosed herein is an optical polarizer comprising a multi-layer dielectric substrate and a plurality of elongated conductive ridges positioned or disposed in spaced relation on a surface of the dielectric substrate.

The multi-layer dielectric substrate may comprise a layer of silicon (Si), a layer of zinc selenide (ZnSe) between the layer of silicon (Si) and the plurality of conductive ridges and a layer of magnesium fluoride (MgF$_2$) between the layer of zinc selenide (ZnSe) and the plurality of conductive ridges.

The multi-layer dielectric substrate may comprise a layer of fused silica (FS), a layer of tantalum pentoxide (Ta$_2$O$_5$) between the layer of fused silica (FS) and the plurality of conductive ridges and a layer of magnesium fluoride (MgF$_2$) between the layer of tantalum pentoxide (Ta$_2$O$_5$) and the plurality of conductive ridges.

The multi-layer dielectric substrate may comprise a bottom layer of silicon dioxide (SiO2), a layer of zinc selenide (ZnSe) between the bottom layer of silicon dioxide (SiO2) and the plurality of conductive ridges, an intermediate layer of silicon dioxide (SiO2) between the layer of zinc selenide (ZnSe) and the plurality of conductive ridges and a top layer of zinc sulfide (ZnS) between the intermediate layer of silicon dioxide (SiO2) and the plurality of conductive ridges.

Also disclosed herein is an optical polarizer comprising a pair of the optical polarizers described above stacked one above the other comprising one of (a) a first arrangement of the pair of optical polarizers with the dielectric substrate of a top one of the pair of the optical polarizers positioned or disposed between the dielectric ridges of the top one of the pair of the optical polarizers and the dielectric ridges of a bottom one of the pair of the optical polarizers which has its dielectric substrate positioned on a side of its elongated dielectric ridges opposite the dielectric substrate of the top one of the pair of the optical polarizers or (b) a second arrangement of the pair of optical polarizers with the elongated dielectric ridges of the pair of the optical polarizers positioned or disposed in an interleaved or interdigitated manner.

In the first arrangement of the pair of optical polarizers, the substrate of the top one of the pair of the optical polarizers may have a reduced thickness versus the substrate of the bottom one of the pair of the optical polarizers. The substrate of the bottom one of the pair of the optical polarizers may be a multi-layer substrate and the substrate of the top one of the pair of the optical polarizers may be a single layer substrate. Any of the optical polarizers described herein may include a substrate that includes a perimeter devoid of ridges, which defines a frame that completely surrounds the plurality of elongated dielectric ridges.

Any of the optical polarizers described herein that comprises elongated dielectric ridges including electrically conductive coatings on each side of each dielectric ridge may include one or more interruptions or gaps in each elongated dielectric ridge, the electrically conductive coating on each side of said dielectric ridge, or both that electrically isolate the electrically conductive coatings on the sections of said elongated dielectric ridge on either side of said interruption or gap. In an example, the interruptions or gaps in adjacent or proximate elongated dielectric ridges and the electrically conductive coating on each side of each ridge may form one or more lines of the interruptions or gaps that extend perpendicular or transverse to the length directions of the plurality of elongated dielectric ridges and the electrically conductive coating on each side of each dielectric ridge. In another example, the interruptions or gaps in adjacent or proximate elongated dielectric ridges and the electrically conductive coating on each side of each ridge are disposed or positioned in a random or offset pattern.

Any of the polarizers described herein that comprises a multi-layer dielectric substrate and a plurality of elongated conductive ridges positioned or disposed in spaced relation on a surface of the dielectric substrate may include one or more interruptions or gaps in each conductive ridge that electrically isolate sections of the conductive ridge on either side of each interruption or gap. In an example, the interruptions or gaps in adjacent or proximate elongated conductive ridges may form a line of interruptions or gaps that extend perpendicular or transverse to the plurality of elongated conductive ridges. In another example, the interruptions or gaps in adjacent or proximate elongated conductive ridges are disposed or positioned in a random or offset pattern.

Also disclosed herein is an optical isolator comprising a polarizer, having a first polarization axis, for directly receiving an optical signal from an optical signal source and for outputting at least a part of the optical signal, a Faraday rotator for directly receiving and for rotating a polarization of the at least part of the optical signal output by the polarizer, and for outputting at least a part thereof as a rotator output optical signal and an analyzer, having a second polarization axis, for directly receiving the rotator output optical signal and for outputting at least a part thereof. The polarizer and the analyzer are coupled to opposed surfaces of the Faraday rotator. Each of the polarizer and the analyzer comprise a plurality of spaced elongated dielectric ridges coupled to one of the surfaces of the Faraday rotator. Each dielectric ridge has a length direction, curved or straight, that extends along the one surface of the Faraday rotator. Each dielectric ridge includes a pair of spaced sides that extend away from, e.g., transverse or perpendicular, the one surface of the Faraday rotator and a top extending between the spaced sides opposite the one surface of the Faraday rotator. Each dielectric ridge includes an electrically conductive coating on each side of the dielectric ridge.

The optical isolator may include a wave plate coupled to a side of the dielectric ridges of the analyzer opposite the Faraday rotator. The wave plate may be a half ($\lambda/2$) wave plate. The wave plate may have a fast axis oriented at 22.5° with respect to the second polarization axis.

Also disclosed herein is a method of forming an optical isolator comprising: (a) providing a polarizer and an analyzer each comprising a dielectric substrate; a plurality of spaced elongated dielectric ridges positioned or disposed on a surface of the dielectric substrate, wherein each dielectric ridge has a length direction [curved or straight] that extends along the surface of the dielectric substrate and each dielectric ridge includes a pair of spaced sides that extend away from, e.g., transverse or perpendicular, the surface of the dielectric substrate and a top spaced from the surface of the dielectric substrate and extending between the spaced sides opposite the surface of the dielectric substrate; and an electrically conductive coating on each side of each dielectric ridge; (b) coupling the dielectric ridges of the polarizer to one surface of a Faraday rotator; and (c) coupling the dielectric ridges of the analyzer to an opposing surface of the Faraday rotator.

The method may include at least one of: (1) wherein step (b) includes coupling the tops the dielectric ridges of the polarizer to the one surface of the Faraday rotator with the dielectric substrate of the polarizer spaced from the one surface of the Faraday rotator; and the method further includes removing at least a portion of the dielectric substrate of the polarizer; and/or (2) wherein step (c) includes coupling the tops the dielectric ridges of the analyzer to the opposing surface of the Faraday rotator with the dielectric substrate of the polarizer spaced from the opposing surface of the Faraday rotator; and the method further includes removing at least a portion of the dielectric substrate of the analyzer.

The method may include coupling a wave plate to the dielectric ridges of the analyzer via a remainder of the dielectric substrate of the analyzer that was removed in step (2).

The method may include at least one of: (1) step (b) includes coupling the dielectric ridges of the polarizer to the one surface of the Faraday rotator via the dielectric substrate of the polarizer; and/or (2) step (c) includes coupling the dielectric ridges of the analyzer to the opposing surface of the Faraday rotator via the dielectric substrate of the polarizer.

Also disclosed herein is an optical isolator comprising a Faraday rotator and an optical polarizer, including a first polarization axis, coupled a surface of the Faraday rotator, wherein the optical polarizer includes a plurality of spaced elongated dielectric ridges coupled to the surface of the Faraday rotator; each dielectric ridge has a length direction that extends along the surface of the Faraday rotator; each dielectric ridge includes a pair of spaced sides that extend away from the surface of the Faraday rotator and a top extending between the spaced sides that is directly coupled to the one surface of the Faraday rotator; and each dielectric ridge includes an electrically conductive coating on each side of the dielectric ridge. The optical isolator may include another optical polarizer, including a second polarization axis, coupled to an opposing surface of the Faraday rotator.

Figure 3:
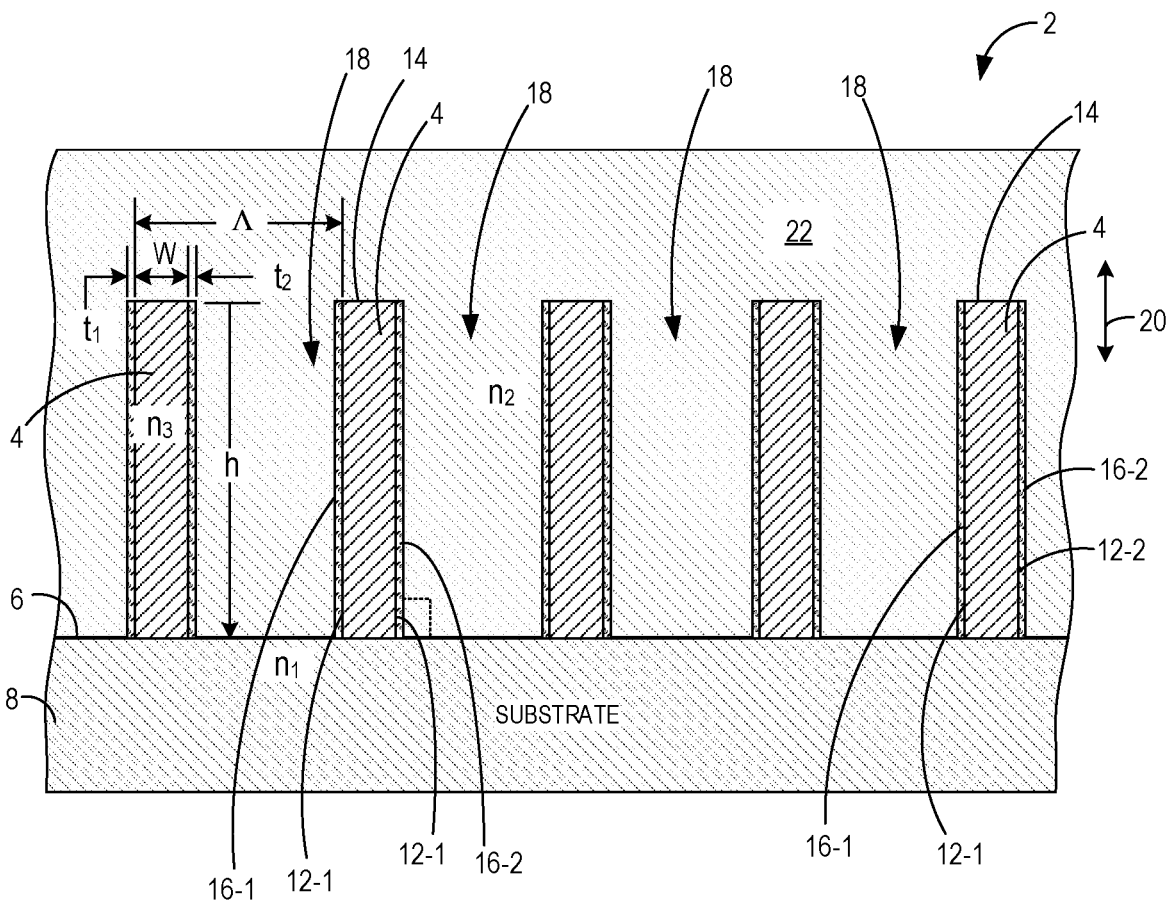
FIG. 3 is a schematic cross-section taken along lines III-III in FIGS. 2 and 4.
Figures 7A, 7B, 7C:
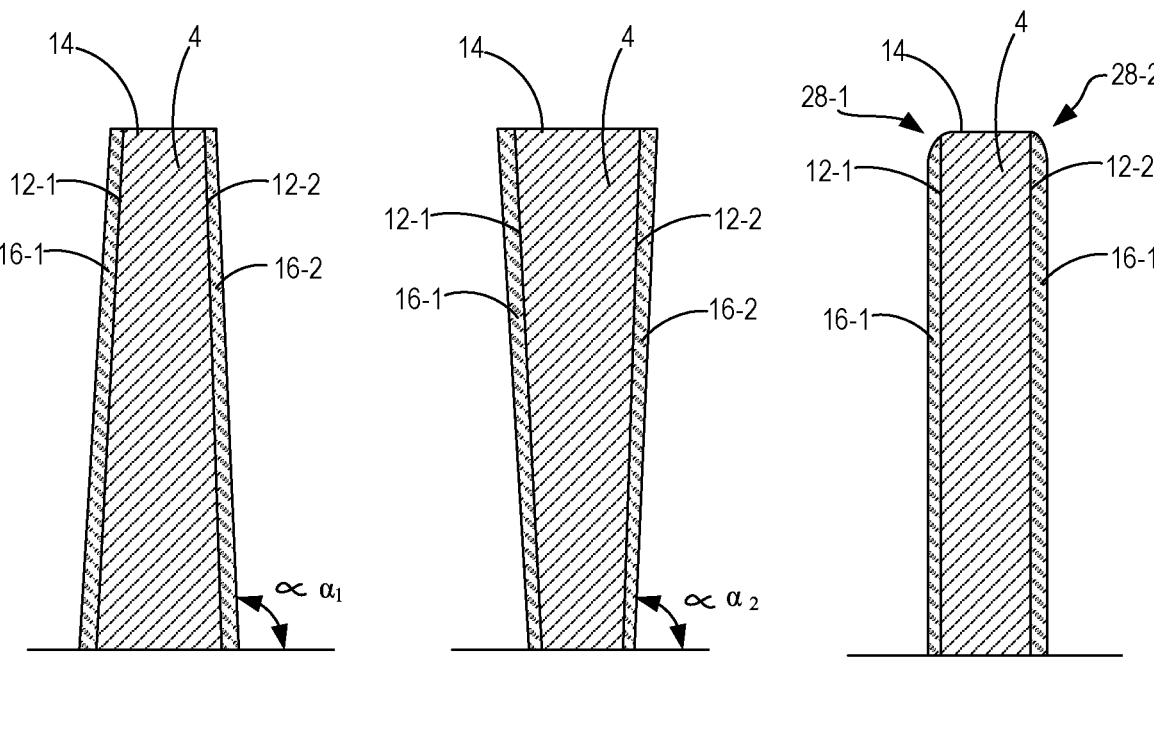
FIG. 7A is a schematic isolated cross-section of another example shaped dielectric ridge, including electrically conductive sides, in accordance with the principles of the present disclosure, including spaced sides that converge from a larger bottom end to a smaller top end, that may be
Figures 7D, 7E:
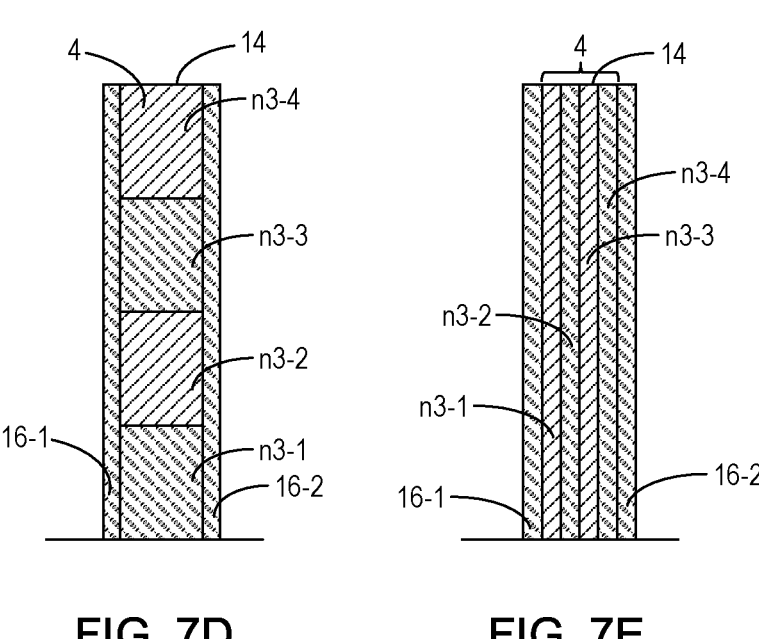
Figure 8:
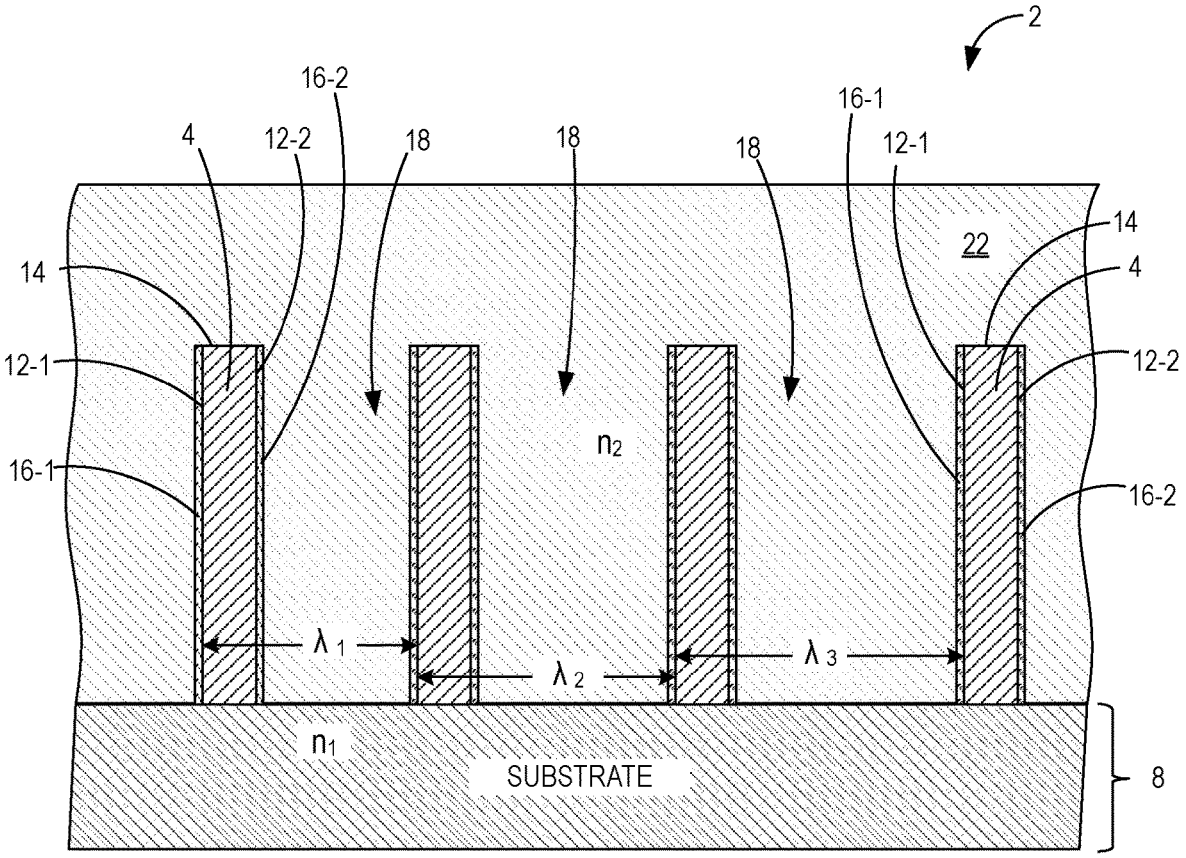
Figure 9:
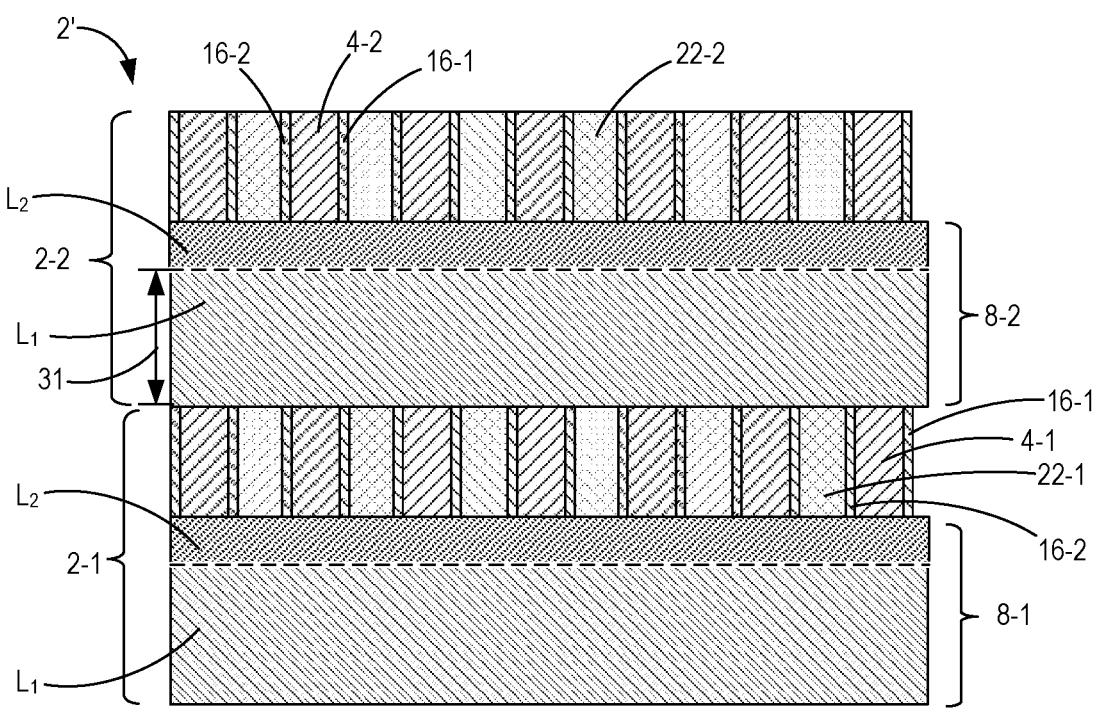
Figure 10:
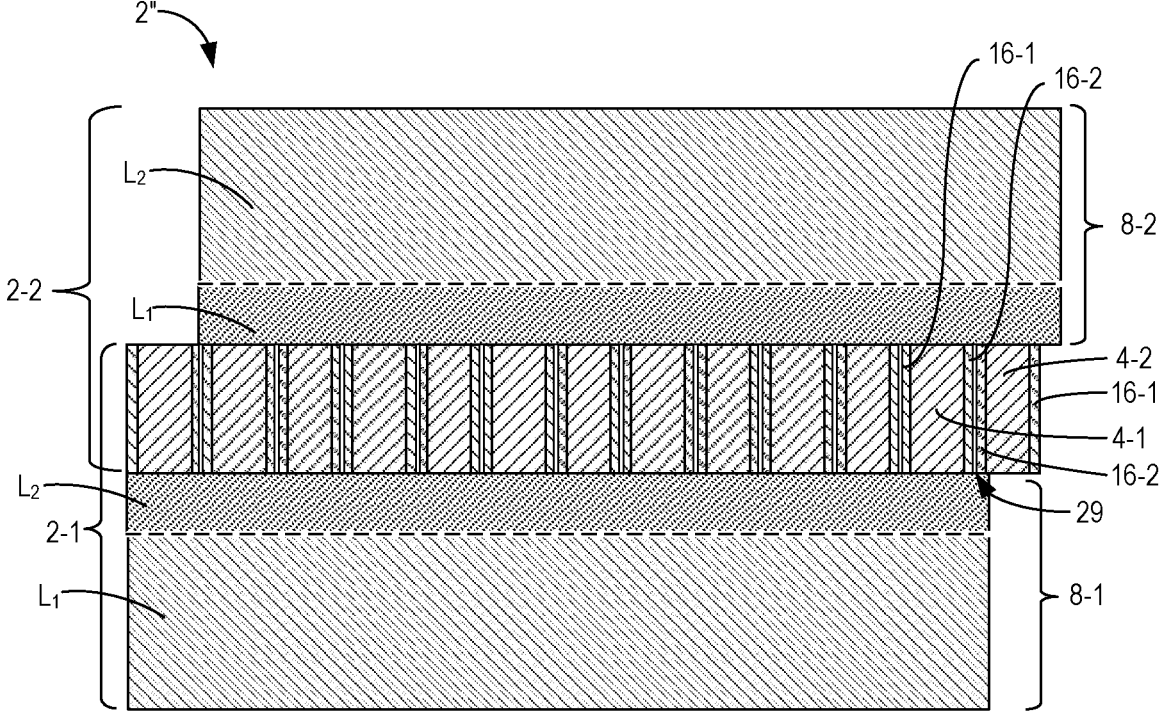
Figure 11:
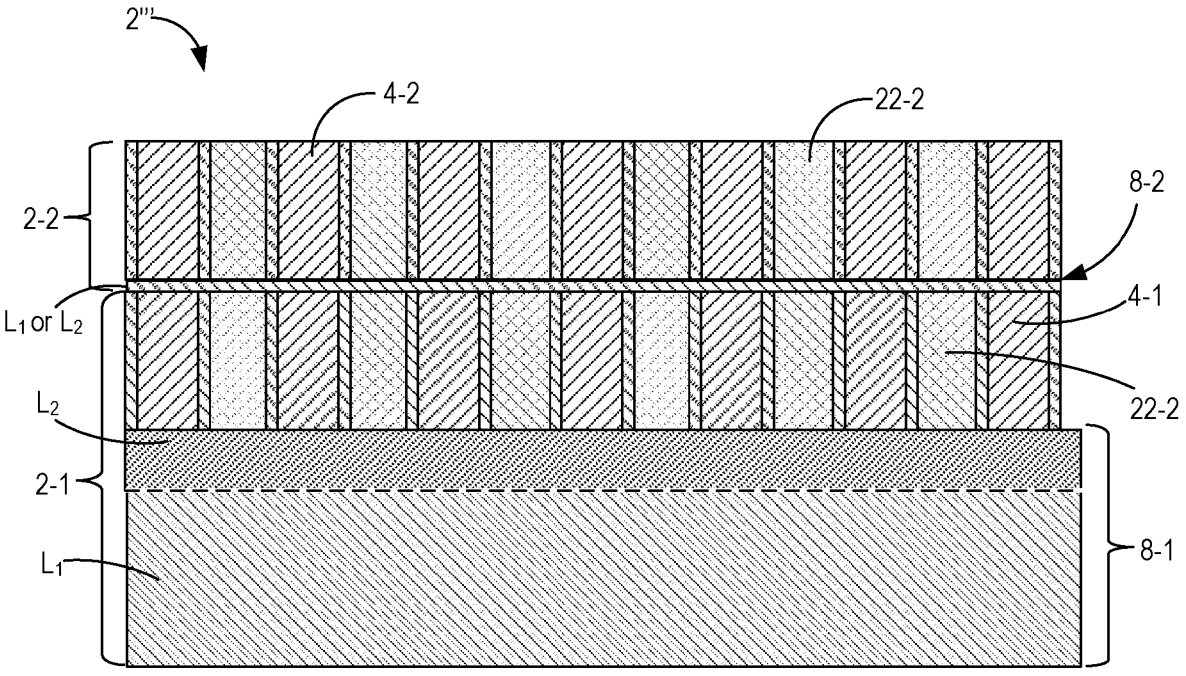
Figure 12:
Figure 13:
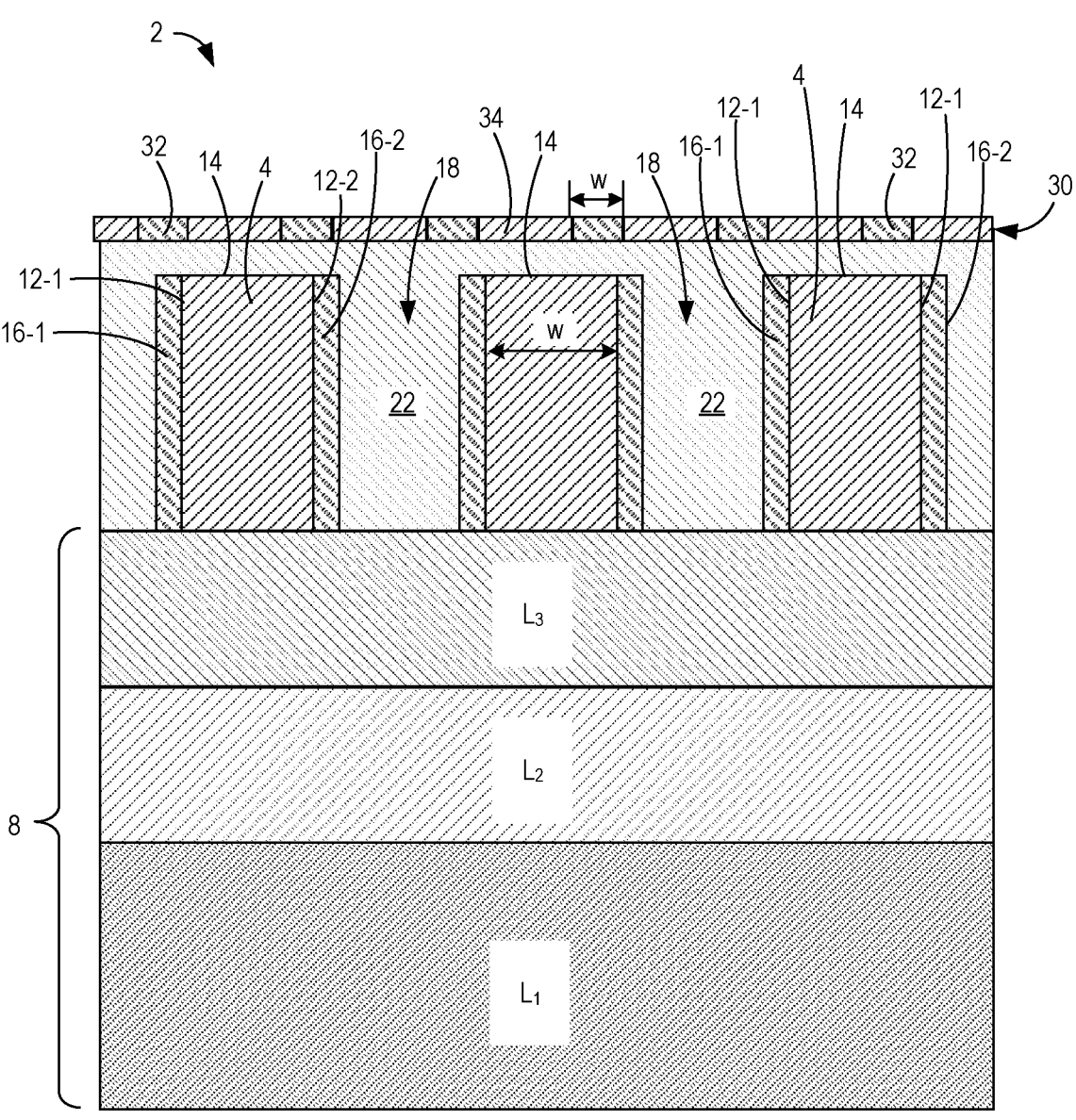
Figure 14:
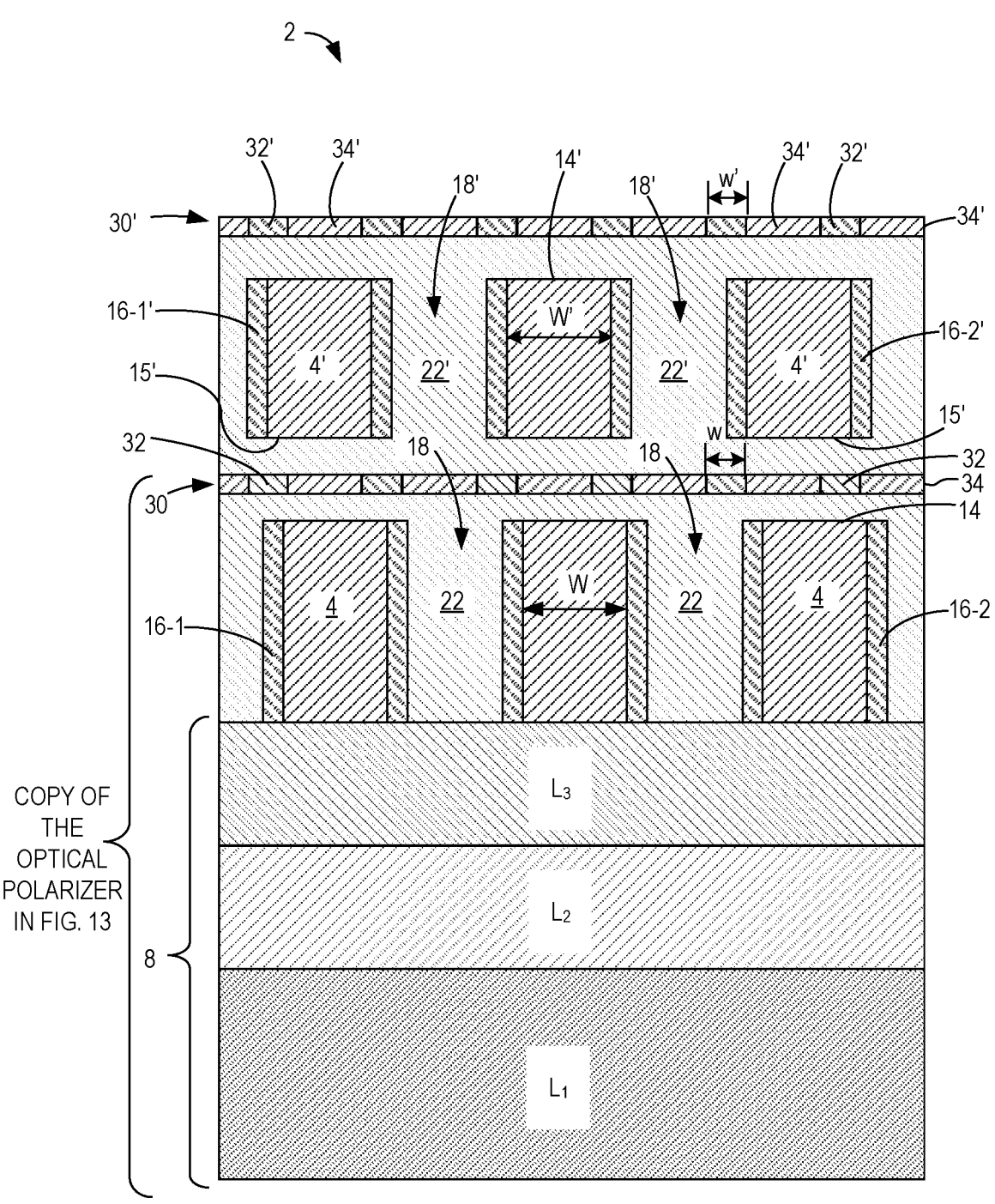
Figure 15:
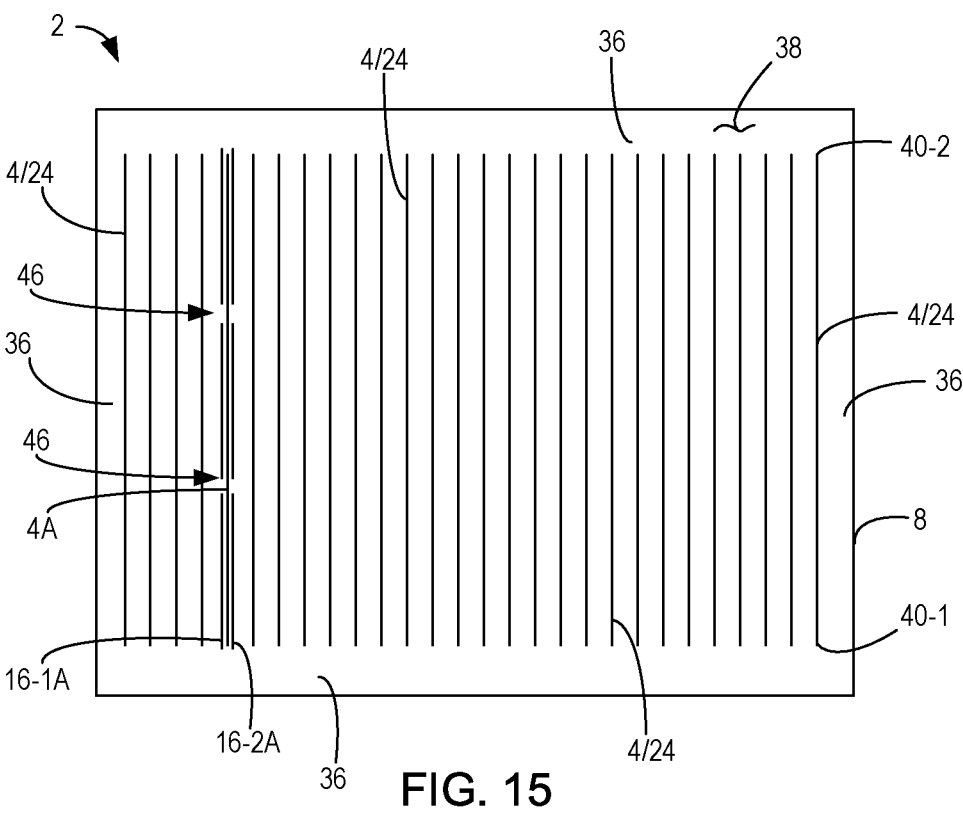
Figure 16:
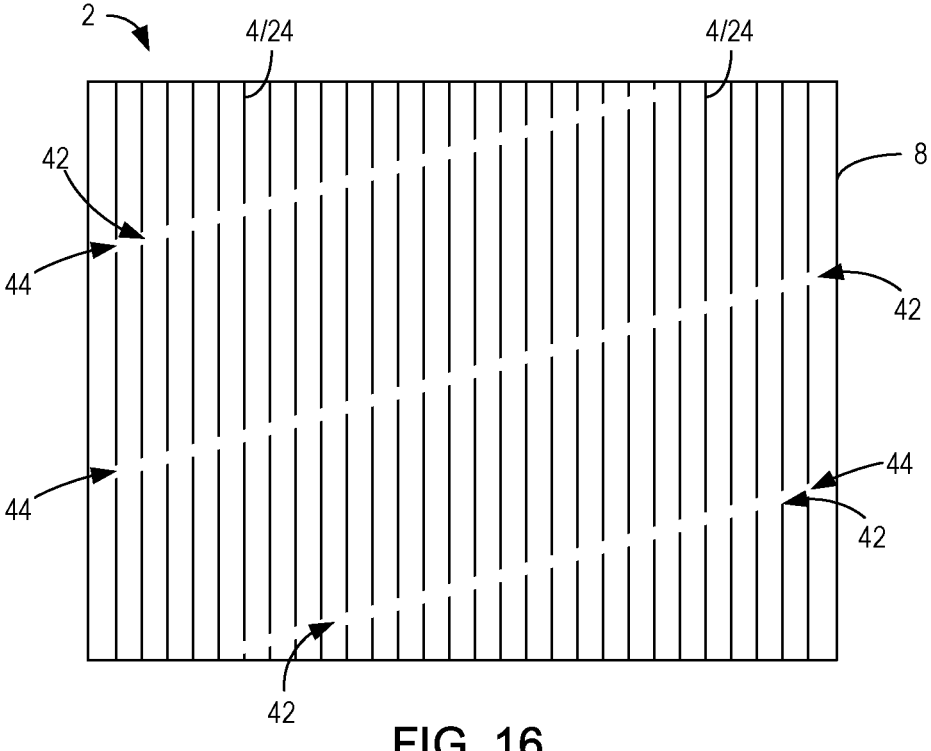
Figures 17, 18:
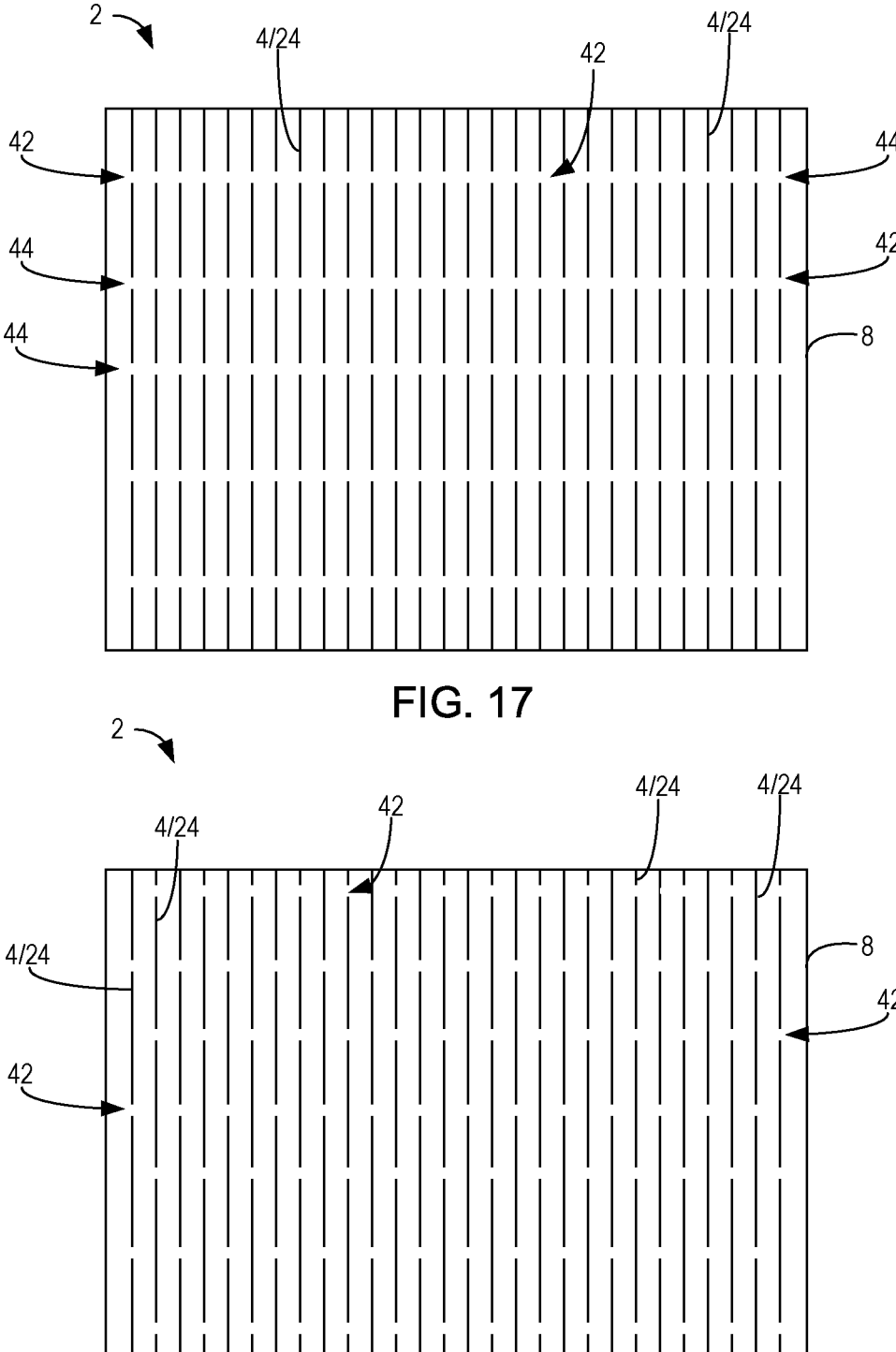
Figure 19:
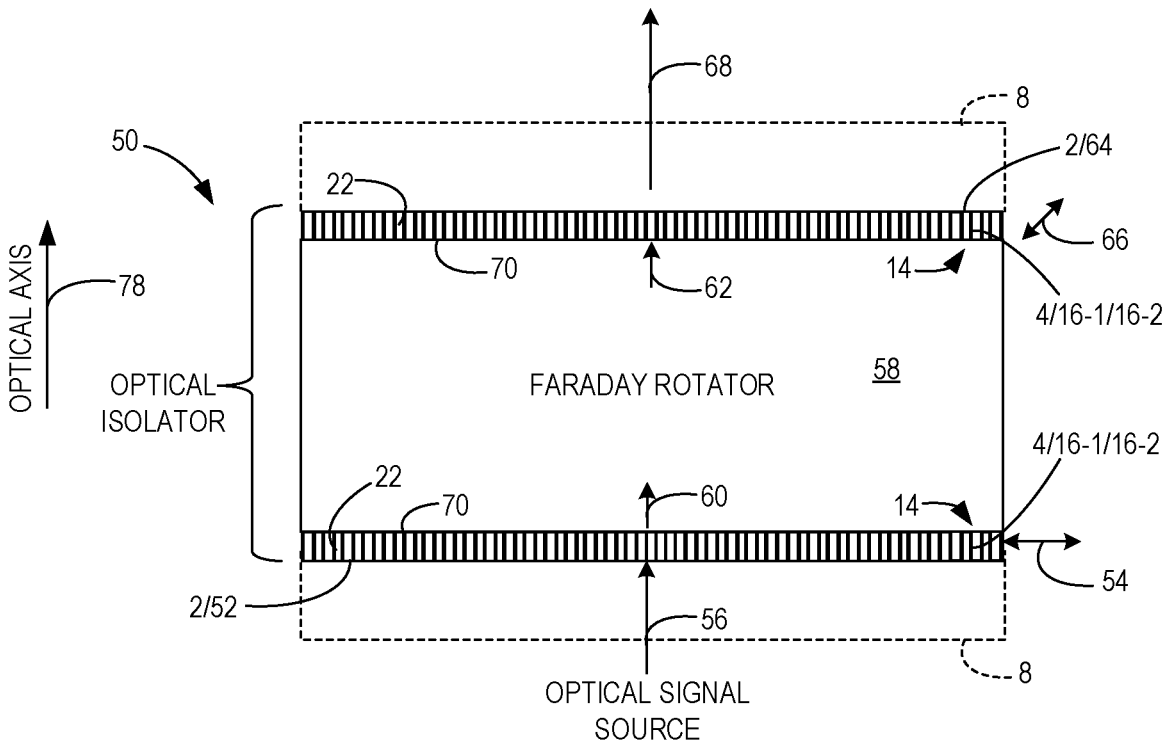
Figure 20:
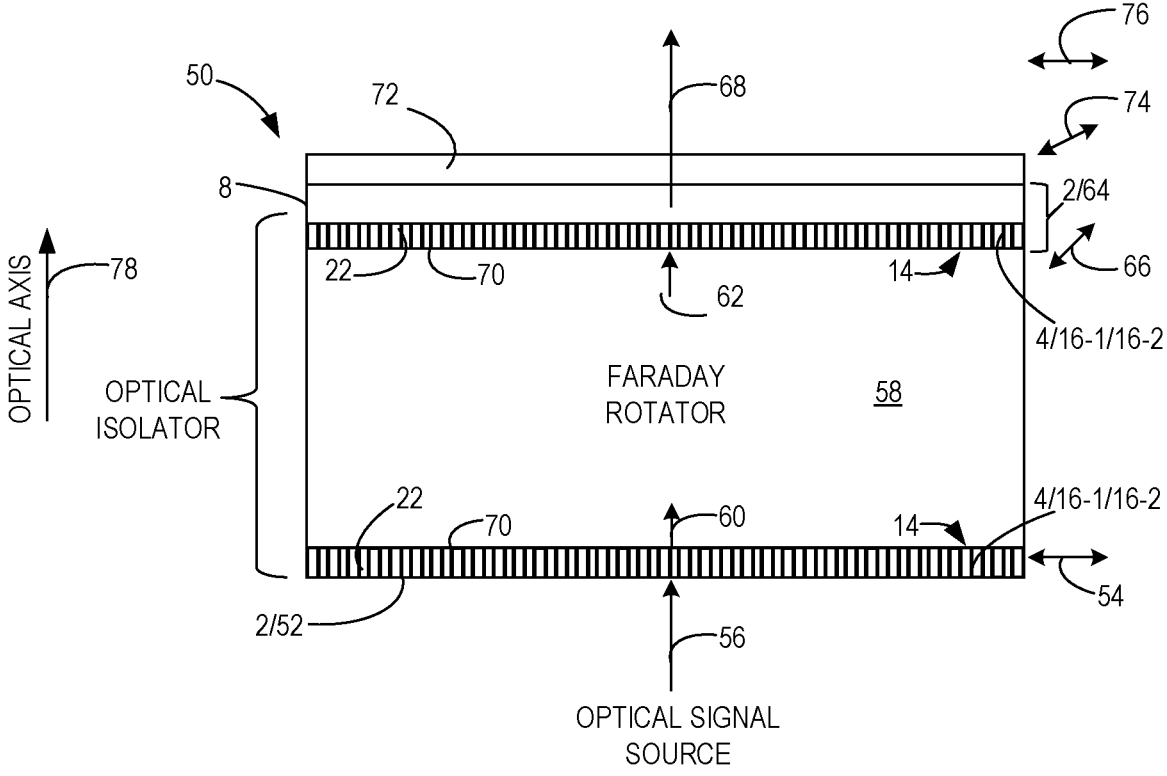
Figure 21:
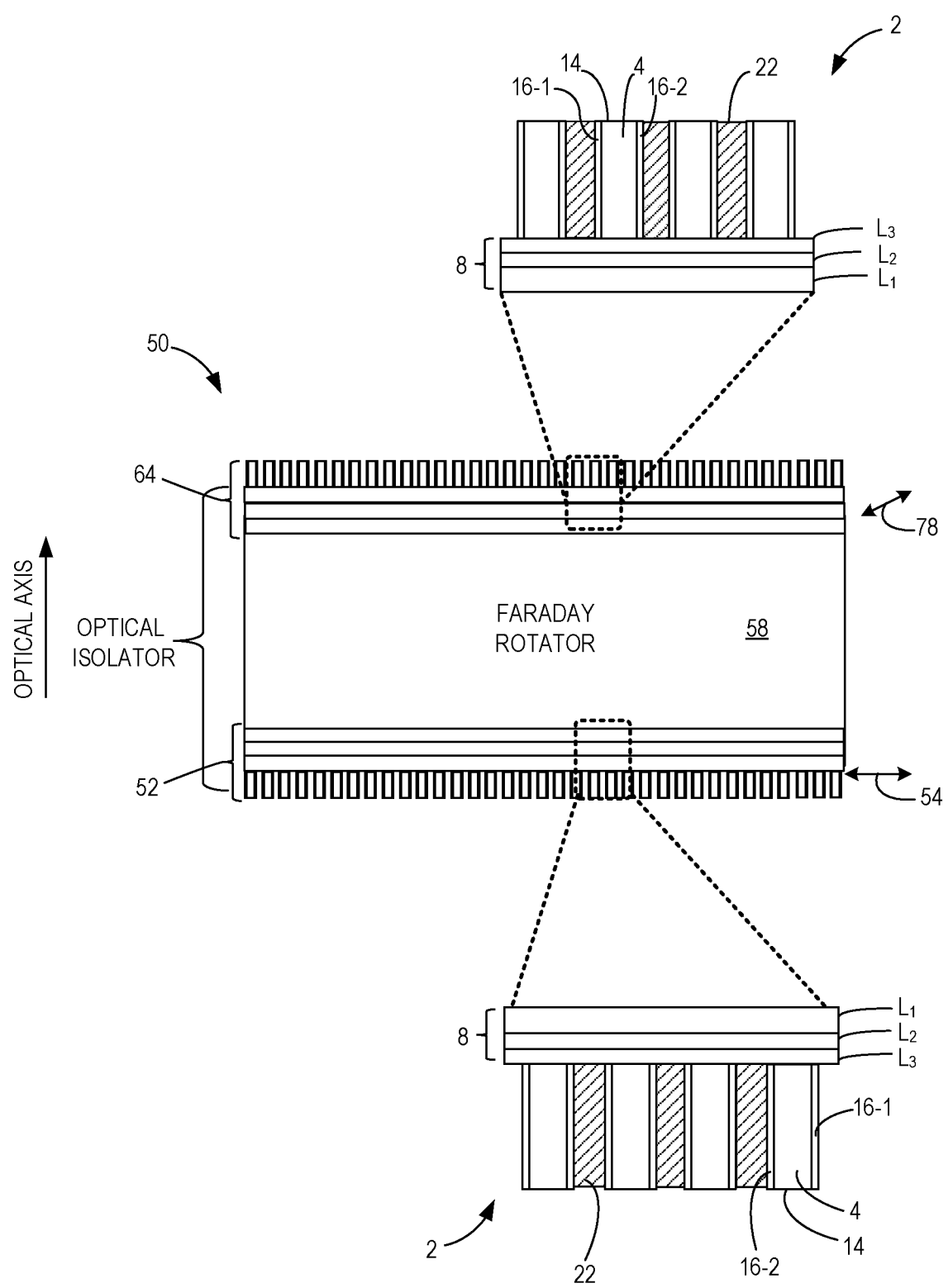

6 used with any of the wire grid polarizers in accordance with the principles of the present disclosure;

FIG. 7B is a schematic isolated cross-section of another example shaped dielectric ridge, including electrically conductive sides, in accordance with the principles of the present disclosure, including spaced sides that diverge from a smaller bottom end to a larger top end, that may be used with any of the wire grid polarizers in accordance with the principles of the present disclosure;

FIG. 7C is a schematic isolated cross-section of another example shaped dielectric ridge, including electrically conductive sides, in accordance with the principles of the present disclosure, including spaced parallel or substantially parallel sides, that extend from the bottom end to a top end that has rounded edges, that may be used with any of the wire grid polarizer in accordance with the principles of the present disclosure;

FIGS. 7D and 7E are schematic isolated cross-section of other example dielectric ridges, including electrically conductive sides, in accordance with the principles of the present disclosure, comprised of a number of horizontal dielectric layers (FIG. 7D) and a number of vertical dielectric layers (FIG. 7E);

FIG. 8 is a schematic cross-section of another example wire grid polarizer in accordance with the principles of the present disclosure, like the wire grid polarizer shown in FIG. 3, but with the dielectric ridges spaced apart from each other by different distances or polarizer periods (Λ), e.g., by varying or chirped polarizer periods;

FIG. 9 is a schematic cross-section of another example wire grid polarizer in accordance with the principles of the present disclosure including two wire grid polarizers, each like the wire grid polarizer shown in FIG. 3, stacked one on-top of the other;

FIG. 10 is a schematic cross-section of another example wire grid polarizer in accordance with the principles of the present disclosure including two wire grid polarizers, each like the wire grid polarizer shown in FIG. 3, joined together with their respective ridges interleaved or interdigitated;

FIG. 11 is a schematic cross-section of another example wire grid polarizer in accordance with the principles of the present disclosure including two wire grid polarizers, each like the wire grid polarizer shown in FIG. 3, stacked one on-top of the other, wherein the substrate of the upper wire grid polarizer has a reduced thickness;

FIG. 12 is a schematic cross-section of another example wire grid polarizer in accordance with the principles of the present disclosure including dielectric ridges, including electrically conductive sides, having rectangular or substantially rectangular shaped cross-sections, on top of a multi-layer substrate, wherein the dielectric ridges are separated by grooves or trenches that are defined by the dielectric ridges, wherein a layer of conductive (e.g., metal) strips is positioned or disposed between the multi-layer substrate and the dielectric ridges;

FIG. 13 is a schematic cross-section of another example wire grid polarizer in accordance with the principles of the present disclosure including dielectric ridges, including electrically conductive sides, having rectangular or substantially rectangular shaped cross-sections, on top of a multi-layer substrate, wherein the dielectric ridges are separated by grooves or trenches that are defined by the dielectric ridges, wherein a layer of conductive (e.g., metal) strips is positioned or disposed above the tops of the dielectric ridges;

FIG. 14 is a schematic cross-section of another example wire grid polarizer in accordance with the principles of the present disclosure including a first (lower) set of dielectric ridges, including electrically conductive sides, having rectangular or substantially rectangular shaped cross-sections, on top of a multi-layer substrate, wherein the first set dielectric ridges are separated by grooves or trenches that are defined by the first set of dielectric ridges, wherein a first (lower) layer of conductive (e.g., metal) strips is positioned or disposed above the tops of the first set of dielectric ridges, and a second (upper) set of dielectric ridges, including electrically conductive sides, having rectangular or substantially rectangular shaped cross-sections, positioned or disposed above the first layer of conductive (e.g., metal) strips, wherein the second set of dielectric ridges are separated by grooves that are defined by the second set of dielectric ridges, wherein a second (upper) layer of conductive (e.g., metal) strips is positioned or disposed above the second set of dielectric ridges;

FIG. 15 is a schematic plan view of another example wire grid polarizer in accordance with the principles of the present disclosure including dielectric ridges, including electrically conductive sides, or conductive ridges that define grooves or trenches between proximate or adjacent ridges, wherein the substrate defines a frame around the ridges;

FIG. 16 is a schematic plan view of another example wire grid polarizer in accordance with the principles of the present disclosure including dielectric ridges, including electrically conductive sides, or conductive ridges that define grooves or trenches between proximate or adjacent ridges, wherein each ridge is separated along its length by one or more gaps and the gaps in the ridges define one or more lines of gaps that extend transverse to the lengths of the ridges;

FIG. 17 is a schematic plan view of another example wire grid polarizer in accordance with the principles of the present disclosure including dielectric ridges, including electrically conductive sides, or conductive ridges that define grooves or trenches between proximate or adjacent ridges, wherein each ridge is separated along its length by one or more gaps and the gaps in the ridges define one or more lines of gaps that extend perpendicular to the lengths of the ridges;

FIG. 18 is a schematic plan view of another example wire grid polarizer in accordance with the principles of the present disclosure including dielectric ridges, including electrically conductive sides, or conductive ridges that define grooves or trenches between proximate or adjacent ridges, wherein the ridges are separated along their lengths by gaps in a random or offset pattern;

FIG. 19 is a schematic side view of an optical isolator in accordance with the principles of the present disclosure including, from bottom to top in the figure, a polarizer (in schematic cross-section), a Faraday rotator, and an analyzer (in schematic cross-section), wherein the polarizer and the analyzer are formed from one or more of the wire grid polarizers described in the present disclosure;

FIG. 20 is a schematic side view of an optical isolator in accordance with the principles of the present disclosure including, from bottom to top in the figure, a polarizer (in schematic cross-section), a Faraday rotator, an analyzer (in schematic cross-section), and a wave plate, wherein the polarizer and the analyzer, are formed from one or more of the wire grid polarizers described in the present disclosure; and FIG. 21 is a schematic side view of an optical isolator in accordance with the principles of the present disclosure including, from bottom to top in the figure, a polarizer (in schematic cross-section), a Faraday rotator, and an analyzer (in schematic cross-section), wherein the polarizer and the analyzer are each formed from one or more of the wire grid polarizers described in the present disclosure that may include a single layer substrate (not shown in FIG. 21) or a multilayer substrate (shown in FIG. 21), wherein the substrate of each of the polarizer and the analyzer is positioned or disposed between the ridges of the polarizer or the analyzer and the Faraday rotator.

DESCRIPTION

As used herein, spatial or directional terms, such as "left", "right", "inner", "outer", "above", "below", and the like, relate to the disclosure as it is shown in the drawing figures. However, it is to be understood that the disclosure can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "approximately" or "about". Accordingly, unless indicated to the contrary, the numerical values set forth in the following specification and claims may vary depending upon the desired properties sought to be obtained by the present disclosure.

At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Various non-limiting examples will now be described with reference to the accompanying figures where like reference numbers correspond to like or functionally equivalent elements.

Disclosed herein are exemplary optical polarizers that may be used for passing a beam of light, at or close to an operational wavelength range, with an electric field orientation or vector perpendicular to dielectric ridges, including on the sides thereof electrically conductive coatings, or conductive ridges and reflecting at least part of the passing light beam with an electric field orientation or vector transverse, but not perpendicular, to said ridges, e.g., with an electric field orientation or vector parallel to the ridges. Also disclosed are exemplary optical isolators, each of which may include one or more of the exemplary optical polarizers described herein.

The various optical polarizers and/or optical isolators described herein may be manufactured by semiconductor fabrication techniques known in the art. Accordingly, for the purpose of simplicity, and unless necessary for an understanding of the construction of one or more of the disclosed optical polarizers and/or optical isolators, the method(s) of manufacturing the various optical polarizers and/or optical isolators may not be described herein.

Figure 2:
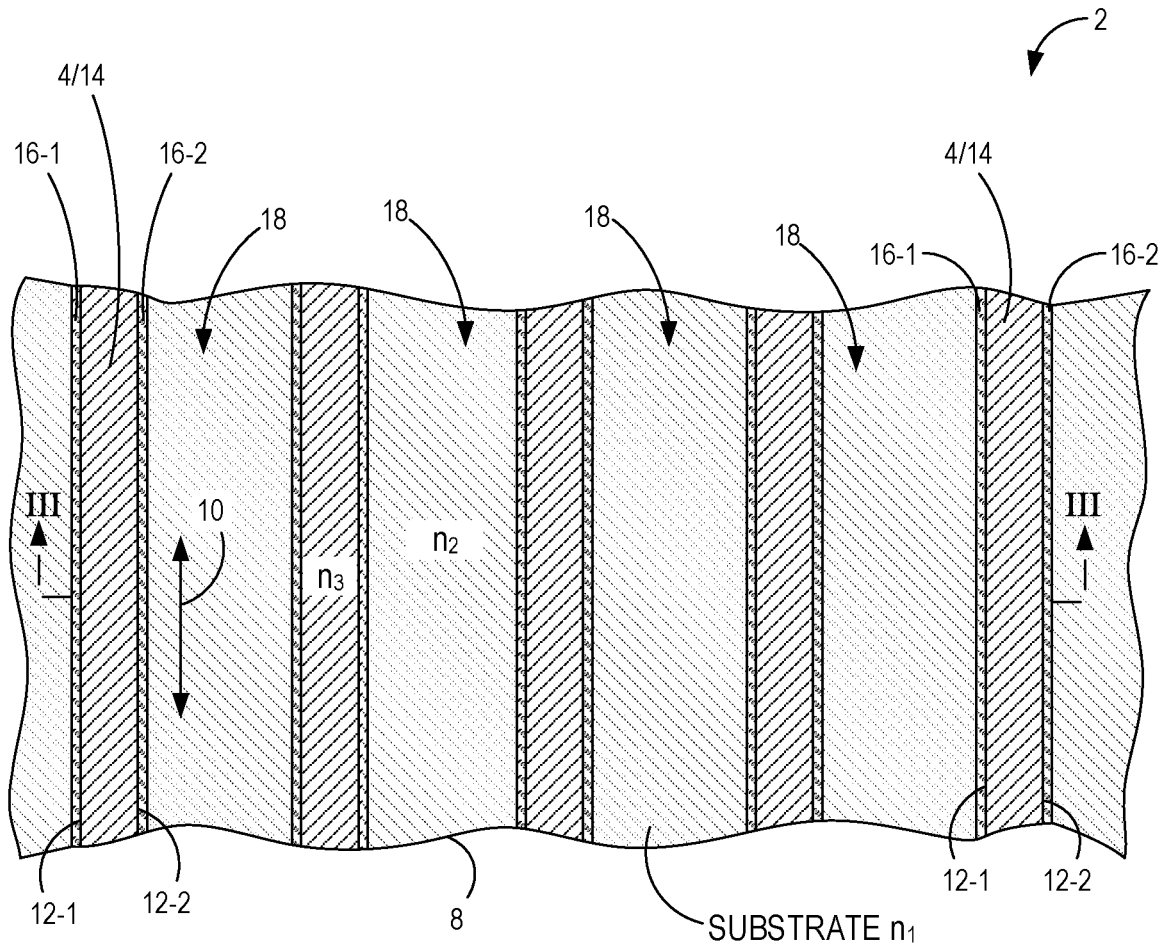
FIG. 2 is a schematic plan view of an example wire grid polarizer in accordance with the principles of the present disclosure including spaced linear, straight or elongated dielectric ridges including electrically conductive sides, having rectangular or substantially rectangular shaped cross-sections, that are separated by grooves or trenches that are defined by the dielectric ridges.

With reference to FIGS. 2 and 3, one non-limiting embodiment or example optical polarizer or optical polarizer assembly 2 in accordance with the principles of this disclosure includes a plurality of elongated dielectric ridges 4, formed by patterning and etching, positioned or disposed in spaced relation, for example, without limitation, spaced parallel relation, on a surface 6 of a dielectric substrate 8. Herein, the terms "optical polarizer assembly" and "optical polarizer" may be used interchangeably.

Each dielectric ridge 4 may have a length direction (shown by arrow 10 in FIG. 2) that extends along the surface 6 of the substrate 8. Each dielectric ridge 4 may have a pair of spaced sides 12-1 and 12-2 that extend away from, e.g., transverse or perpendicular, the surface 6 of the substrate 8 and a top 14 extending between the spaced sides 12-1 and 12-2 opposite the surface 6 of the substrate 8. The sides 12-1 and 12-2 of each dielectric ridge 4 may include electrically conductive coatings 16-1 and 16-2, respectively.

In an example, one or both of the electrically conductive coatings 16-1 and 16-2 of each dielectric ridge 4 may be formed from, for example, aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound, conformally coated on the sides 12-1 and 12-2 and a top 14 the dielectric ridge 4 and on the surface 6 of the dielectric substrate 8 in the grooves or trenches 18 between proximate or adjacent ridges 4. In an example, gold (Au), platinum (Pt), palladium (Pd), iridium (Ir), osmium (Os), rhodium (Rh), and ruthenium (Ru), or an alloy or amalgamation thereof, are desirable for the electrically conductive coatings 16-1 and 16-2 because of their low oxidation. Thereafter, the electrically conductive coating covering the tops 14 of the ridges 4 and the electrically conductive coating on the surface 6 of the dielectric substrate 8 in the grooves or trenches 18 between proximate or adjacent ridges may be removed, e.g., via anisotropic reactive ion etching.

Figure 1:
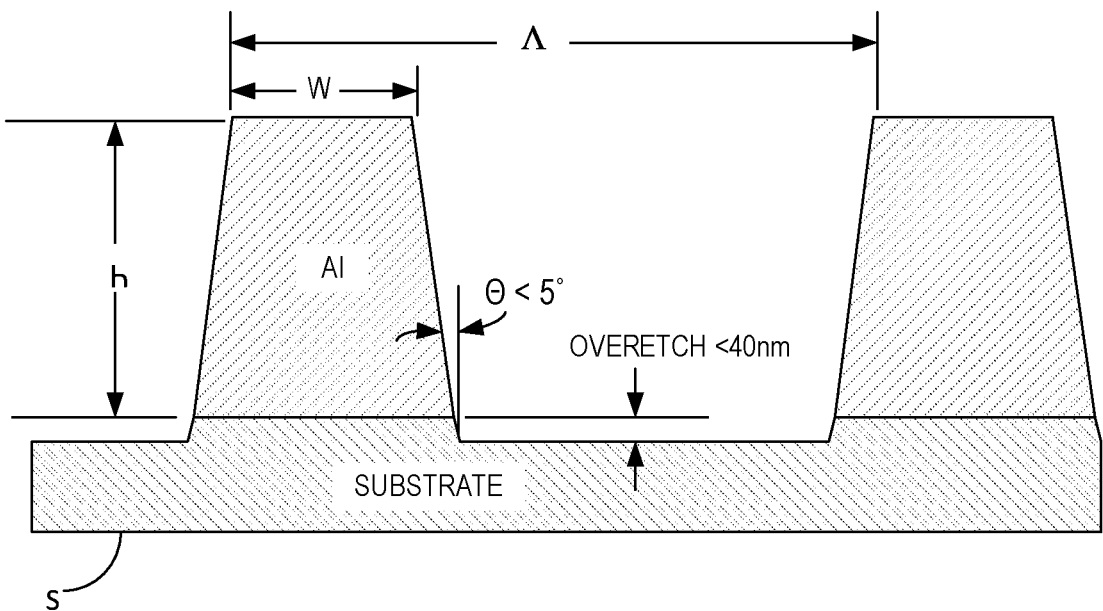
FIG. 1 is a schematic cross-section of an example prior art wire grid polarizer.

Comparing the example optical polarizer assembly 2 of FIGS. 2 and 3 to the prior art optical polarizer shown in FIG. 1, it can be understood that the example optical polarizer assembly 2 of FIGS. 2 and 3 includes less electrically conductive material in a path 20 of a light beam that propagates vertically upwardly or downwardly through the example optical polarizer assembly 2 shown in FIG. 2. Moreover, while the various example optical polarizer assemblies 2 in the figures of this disclosure are shown as having a profile with flat sidewalls (e.g., the sides 12-1 and 12-2 of each dielectric ridge 4 and/or the exposed sides of the conductive coatings 16-1 and 16-2 on the sides 12-1 and 12-2 of each dielectric ridge 4 are flat), this this not to be construed in a limiting sense since it is envisioned that one, some or all of these sidewalls may have non-flat profiles. For example, without limitation, a sidewall may have a converging or diverging profile (see FIGS. 7A-7B), a concave or convex profile, a sinusoid profile, or any other shape sidewall. Furthermore, the profiles of the various example optical polarizer assemblies 2 in the figures of this disclosure may include overetch into the substrate 8 (e.g., as shown by the overetch in the substrate S in FIG. 1) and/or may include underetch into the ridge (e.g., as shown by the angle θ in FIG. 1).

In an example, the substrate 8 may have a refractive index of $n_1$. The grooves or trenches 18 and, optionally, the superstrate (ambient medium) above and/or around or surrounding the dielectric ridges 4 including the electrically conductive coatings 16-1 and 16-2 may include or be filled with a dielectric medium 22 having a refractive index of $n_2$. In an example, the dielectric medium 22 may be in each groove or trench 18 between the facing sides of adjacent or proximate pairs of dielectric ridges 4. Throughout this disclosure, examples of the dielectric medium 22 being between the facing sides of adjacent or proximate pairs of dielectric ridges 4 may include: each groove or trench 18 may be partially filled with the dielectric medium 22; each groove or trench 18 may include the dielectric medium 22 covering all or part of the electrically conductive coatings 16-1 and 16-2 on one or both sides of the groove or trench 18 and all or part of the base or bottom of the groove or trench 18 thereby defining a space above the base or bottom and between the electrically conductive coatings 16-1 and 16-2 that is devoid of the dielectric medium 18; and the dielectric medium 22 covering at least part of the electrically conductive coatings 16-1 and 16-2 on either side of the groove or trench 18, the tops 14 of the adjacent or proximate dielectric ridges 4 that define the groove or trench 18, and, optionally, at least part of the base or bottom of the groove or trench 18 between the electrically conductive coatings 16-1 and 16-2 whereupon a space above the base or bottom and between the electrically conductive coatings 16-1 and 16-2 is devoid of the dielectric medium 18. The dielectric ridges 4 may have a refractive index of $n_3$. In an example, $n_1$, $n_2$, and $n_3$ may all have the same value or one or more of $n_1$, $n_2$, and $n_3$ may have a different value. Moreover, the dielectric medium 22 having a refractive index of $n_2$ may be solid or a gas, e.g., without limitation, the ambient environment or ambient air.

As with the prior art optical polarizer shown in FIG. 1, the example optical polarizer assembly 2 polarizer shown in FIGS. 2 and 3 may have a polarizer period of $\Lambda$ and a duty cycle $(w+t_1+t_2)/\Lambda$, where w is the width of the dielectric ridge 4 of dielectric material having the refractive index $n_3$ that includes electrically conductive coatings 16-1 and 16-2 of thickness $t_1$ and $t_2$ respectively. Additional (horizontal) layers with distinct refractive indices may be introduced between the substrate 8 and the dielectric ridges 4 including the electrically conductive coatings 16-1 and 16-2. In this example, $n_1$, $n_2$, $n_3 \in \mathbb{R}$, i.e., materials that are dielectric. The electrically conductive coatings 16-1 and 16-2 of widths $t_1$ and $t_2$ may be formed of multiple distinct materials and may thereby have a complex refractive index (e.g., absorptive materials), e.g., typically metals.

In the example optical polarizer assembly 2 of FIGS. 2 and 3, $\Lambda$ may have a value of 300 nm; w may have a value of 130 nm±50 nm; h may have a value of 450 nm±50 nm; $t_1$ may have a value of 20 nm, and $t_2$ may have a value of 20 nm. However, in this example and the other examples described in this disclosure, the values of $\Lambda$, w, h, $t_1$ and $t_2$ are exemplary and are not to be construed in a limiting sense since is it envisioned that one or more of these values may be different, e.g., one or more of these values may be selected based on the wavelength of the light beam to propagate through the example optical polarizer assembly 2 shown in FIGS. 2 and 3.

Figure 4:
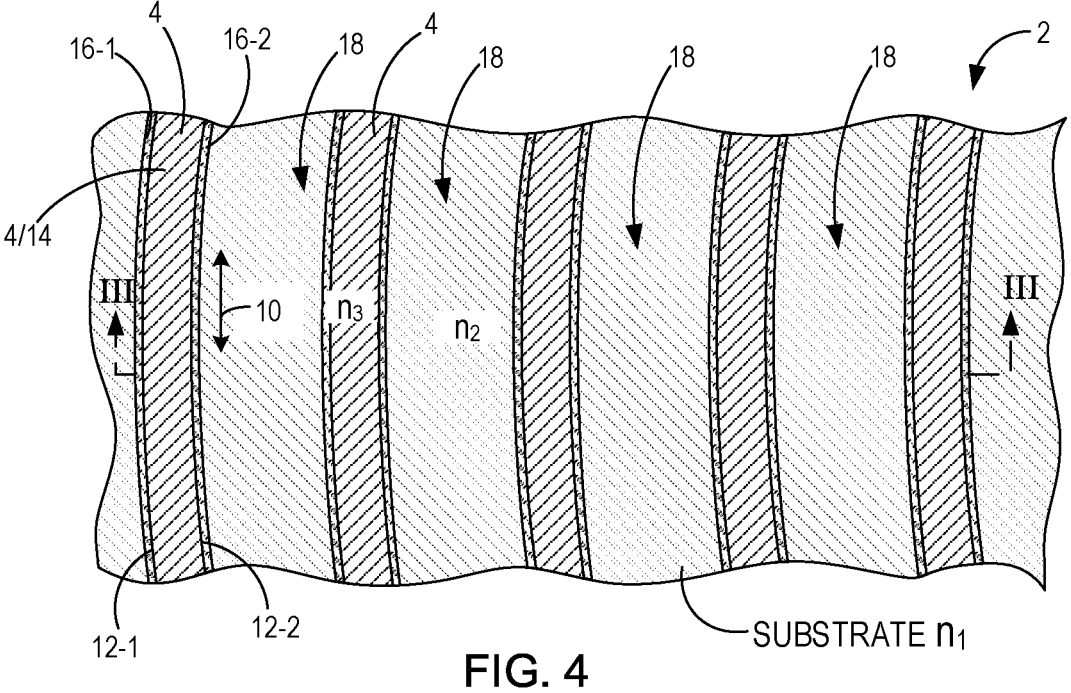
FIG. 4 is a schematic plan view of another example wire grid polarizer in accordance with the principles of the present disclosure including spaced curved dielectric ridges including electrically conductive sides, having rectangular or substantially rectangular shaped cross-sections, separated by grooves or trenches that are defined by the dielectric ridges.

With reference to FIG. 4 and with continuing reference to FIGS. 2 and 3, with the following exception, the example optical polarizer assemblies 2 shown in FIGS. 2 and 4 are the same. The exception is that the dielectric ridges 4 including the electrically conductive coatings 16-1 and 16-2 in FIG. 4 may be curved or arched versus the straight or linear dielectric ridges 4 including the electrically conductive coatings 16-1 and 16-2 shown in FIG. 2.

Figure 5:
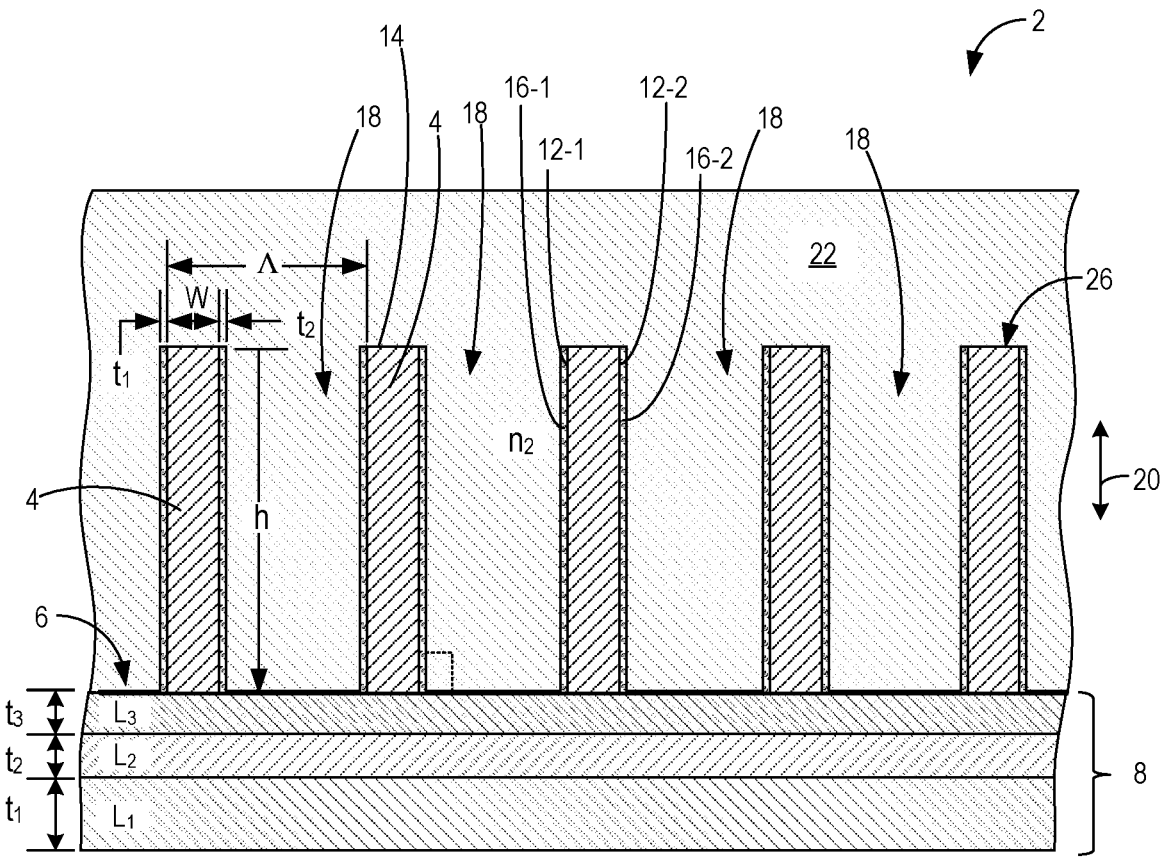
FIG. 5 is a schematic cross-section of another example wire grid polarizer, like the wire grid polarizer shown in FIG. 3, but with a multi-layer substrate versus the single layer substrate of FIG. 3.

With reference to FIG. 5 and with continuing reference to FIG. 3, with the following exception, the example optical polarizer assemblies 2 shown in FIGS. 3 and 5 are the same. The exception is that in FIG. 5 the substrate 8 is a multi-layer substrate 8, versus the single layer substrate 8 shown in FIG. 3. In an example, the multi-layer substrate 8 shown in FIG. 5 may include multiple (two or three or more) layers. In an example, at least two of said multiple layers may be of different materials or compounds having different refractive indices. Also, in this example, the dielectric medium 22 may be the ambient environment or ambient air, whereupon the value of the refractive index of $n_2$ of the dielectric medium 22 is that of the ambient environment or ambient air.

In one specific and non-limiting example, the multi-layer substrate 8 of FIG. 5 may include three layers $L_1$, $L_2$, and $L_3$ of the same or different materials or compounds. However, this is not to be construed in a limiting sense. In an example, layer $L_1$ may be a layer of silicon (Si) having a thickness $t_1$ of any suitable and/or desirable value, e.g., determined by the application; layer $L_2$ may be a layer of zinc selenide (ZnSe) having a thickness $t_2$ of 370 nm±30 nm; and layer $L_3$ may be a layer of magnesium fluoride (MgF2) having a thickness $t_3$ of 425 nm±30 nm. However, this is not to be construed in a limiting sense since it is envisioned that the thickness of each layer L and the material(s) or composition(s) forming each layer L may be selected for a particular application.

In a first instance of the example optical polarizer assembly 2 of FIG. 5 that may be used in the mid-infrared spectral range, the electrically conductive coatings 16-1 and 16-2 may be made of aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the electrically conductive coatings 16-1 and 16-2 because of their low oxidation. In this example, the electrically conductive coatings 16-1 and 16-2 may be made of aluminum (Al); $\Lambda$ may have a value of 300 nm; w may have a value of 120 nm±30 nm; h may have a value of 350 nm±15 nm; $t_1$ may have a value of 30 nm±5 nm, and $t_2$ may have a value 30 nm±5 nm. However, these values are not to be construed in a limiting sense since is it envisioned that one or more of these values may be different, e.g., one or more of these values may be design or selected based on the wavelength of the light beam intended to be propagated through this first instance of the example optical polarizer assembly 2 shown in FIG. 5.

In this first instance of the example optical polarizer assembly 2 shown in FIG. 5 and described above, the dielectric medium 22 may be the ambient environment or ambient air, whereupon the value of the refractive index of n2 of the dielectric medium 22 may be that of the ambient environment or ambient air. This first instance of the example optical polarizer assembly 2 shown in FIG. 5 and described above has been estimated or determined to have an extinction ratio (ER)>50 dB and a transmissivity (T)>97% over a wavelength range $\lambda$ of 3 $\mu$m to 5 $\mu$m.

In a second instance of the example optical polarizer assembly 2 of FIG. 5 that may be used in the mid-infrared spectral range, the electrically conductive coatings 16-1 and 16-2 may be made of gold (Au), instead of Al. In this second instance of the example optical polarizer assembly 2 of FIG. 5, $\Lambda$ may have a value of 300 nm; w may have a value of 105 nm±20 nm; h may have a value of 400 nm±20 nm; $t_1$ may have a value of 30 nm±5 nm, and $t_2$ may have a value 30 nm±5 nm. However, these values are not to be construed in a limiting sense since is it envisioned that one or more of these values may be different, e.g., one or more of these values may be designed or selected based on the wavelength of the light beam intended to be propagated through this second instance optical polarizer assembly 2 shown in FIG. 5.

In a third instance of the example optical polarizer assembly 2 of FIG. 5, layer $L_3$ (MgF2) may have a thickness $t_3$ of 395 nm±15 nm; layer $L_2$ (ZnSe) may have a thickness $t_2$ of 370 nm±20 nm; and layer $L_1$ (Si) may have any suitable and/or desirable thickness, e.g., determined by the application. However, these thicknesses are not to be construed in a limiting sense.

In this third instance of the example optical polarizer assembly 2 shown in FIG. 5 and described above, the dielectric medium 22 may be the ambient environment or ambient air, whereupon the value of the refractive index of $n_2$ of the dielectric medium 22 may be that of the ambient environment or ambient air. This third instance of the example optical polarizer assembly 2 of FIG. 5 has been estimated or determined to have an extinction ratio (ER) of >50 dB and a transmissivity (T)>97%.

Figure 6:
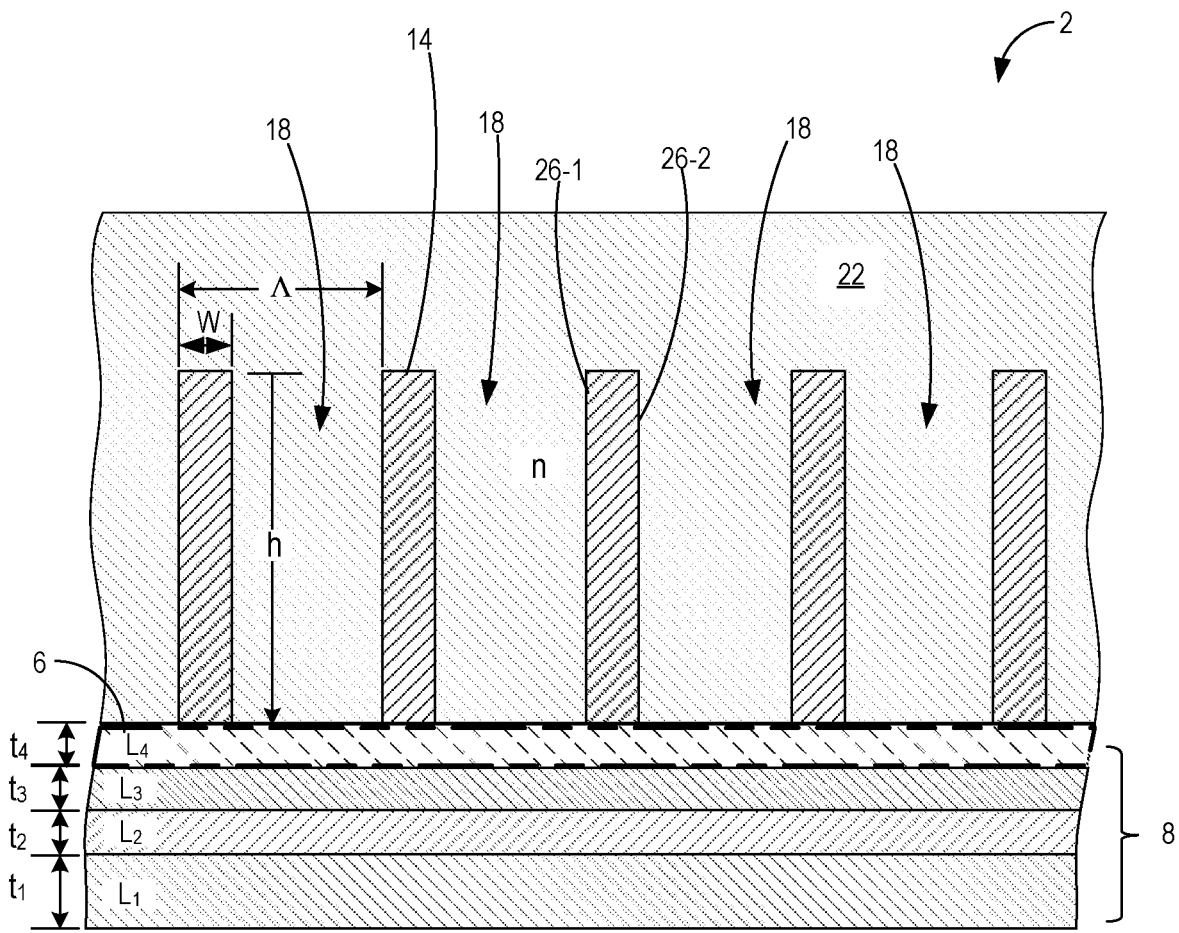
FIG. 6 is a schematic cross-section of another example wire grid polarizer in accordance with the principles of the present disclosure including spaced linear, straight or elongated conductive ridges having rectangular or substantially rectangular shaped cross-sections, that are separated by grooves or trenches that are defined by the conductive ridges, on a multi-layer substrate.

With reference to FIG. 6, another non-limiting embodiment or example optical polarizer assembly 2 in accordance with the principles of this disclosure may include a plurality of elongated conductive ridges 24 made entirely from an electrically conductive material such as, for example, without limitation, aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the conductive ridges 24 because of their low oxidation. In this example, the plurality of conductive ridges 24 are positioned or disposed in spaced relation, for example, without limitation, spaced parallel relation, on the surface 6 of the dielectric substrate 8. Each conductive ridge 24 may have a length direction that extends (straight or curved, like the length directions 10 shown in FIGS. 2 and 4) along the surface 6 of the substrate 8, i.e., into the page containing FIG. 6. Each conductive ridge 24 may have a pair of spaced sides 25-1 and 25-2 that extend away from, e.g., transverse or perpendicular, the surface 6 of the substrate 8 and a top 14 extending between the spaced sides 25-1 and 25-2 opposite the surface 6 of the substrate 8. The conductive ridges 24 in FIG. 6 may not include the electrically conductive coatings 16-1 and 16-2 shown in FIGS. 2-5.

In an example, substrate 8 of the example optical polarizer assembly 2 shown in FIG. 6 may be a multi-layer substrate 8 that may include multiple (two, three, four, or more) layers. In an example, at least two of said multiple layers may be made from different materials or compounds that may have different refractive indices.

A first instance of the optical polarizer assembly 2 shown in FIG. 6 that may be useful in the near infrared spectral range may include four layers $L_1$, $L_2$, $L_3$ and $L_4$ of the same or different materials or compounds. However, this is not to be construed in a limiting sense. In this first instance of the optical polarizer assembly 2 shown in FIG. 6, layer $L_1$ may be layer of silicon dioxide (SiO2) of any suitable and/or desirable thickness; layer $L_2$ may be a layer of zinc selenide (ZnSe) having a thickness $t_2 = 268$ nm; layer $L_3$ may be layer of silicon dioxide (SiO2) having a thickness $t_3$ 251 nm; and layer $L_4$ (shown in phantom) may be a layer of zinc sulfide (ZnS) having a thickness $t_4 = 231$ nm. However, this is not to be construed in a limiting sense since it is envisioned that the thickness of each layer L and the material(s) or composition (s) forming each layer L may be selected for a particular application.

In this first instance of the optical polarizer assembly 2 shown in FIG. 6, the dielectric medium 22 in the grooves or trenches 18 and the superstrate (ambient medium) above and/or around the conductive ridges 4 (made of Al) may have a refractive index of n. In an example, the dielectric medium 22 may be an epoxy or SiO2. However, this is not to be construed in a limiting sense. The value of the refractive index n of the dielectric medium 22 may be 1.54. However, this also is not to be construed in a limiting sense.

In this first instance of the optical polarizer assembly 2 shown in FIG. 6, A may have a value of 300 nm; w may have a value of 80 nm; and h may have a value of 490 nm. However, these values are not to be construed in a limiting sense since is it envisioned that one or more of these values may be different, e.g., one or more of these values may be selected based on the wavelength of the light beam desired to be propagated through this first instance of the optical polarizer assembly 2 shown in FIG. 6.

This first instance of the optical polarizer assembly 2 shown in FIG. 6 and described above has been estimated or determined to have an extinction ratio (ER)=40 dB, a transmissivity (T)=93% and a reflection loss (R)=0.5%.

A second instance of the optical polarizer assembly 2 shown in FIG. 6 that may be useful in the mid infrared spectral range may include three layers $L_1$, $L_2$, and $L_3$ of the same or different materials or compounds, i.e., layer $L_4$ (shown in phantom in FIG. 6) is omitted or not present. However, this is not to be construed in a limiting sense. In this second instance, layer $L_1$ may be a layer of silicon (Si) of any suitable and/or desirable thickness, e.g., determined by the application; layer $L_2$ may be a layer of zinc sulfide (ZnS) having a thickness $t_2 = 348$ nm; and layer $L_3$ may be layer of magnesium fluoride (MgF2) having a thickness $t_3 = 203$ nm. However, this is not to be construed in a limiting sense since it is envisioned that the thickness of each layer L and the material(s) or composition(s) forming each layer L may be selected for a particular application.

In this second instance of the optical polarizer assembly 2 shown in FIG. 6, the dielectric medium 22 in the grooves or trenches 18 and the superstrate (ambient medium) above and/or around the dielectric ridges 4, made, for example, of Pt, may be the ambient environment or ambient air having a refractive index of n of the ambient environment or ambient air. However, this is not to be construed in a limiting sense.

In this second instance of the optical polarizer assembly 2 shown in FIG. 6, A may have a value of 300 nm; w may have a value of 95 nm; and h may have a value of 510 nm. However, these values are not to be construed in a limiting sense since is it envisioned that one or more of these values may be different, e.g., one or more of these values may be selected based on the wavelength of the light beam desired to be propagated through the second instance optical polarizer assembly 2 shown in FIG. 6.

This second instance of the optical polarizer assembly 2 shown in FIG. 6 and described above has been estimated or determined to have an extinction ratio (ER)>40 dB, a transmissivity (T)>95% and a reflection loss (R)<2%. In comparison, an optical polarizer assembly without the multi-layer substrate 8, i.e., a single layer substrate, may only provide a transmissivity (T) of about 74%.

A third instance of the optical polarizer assembly 2 shown in FIG. 6 that may be useful in the near infrared spectral range may include three layers $L_1$, $L_2$, and $L_3$ of the same or different materials or compounds, i.e., layer $L_4$ (shown in phantom in FIG. 6) is omitted or not present. However, this is not to be construed in a limiting sense. In this third instance, layer $L_1$ may be a layer of fused silica (FS) of any suitable and/or desirable thickness, e.g., determined by the application; layer $L_2$ may be a layer of tantalum pentoxide (Ta2O5) having a thickness $t_2 = 273$ nm and a refractive index of 2.1; and layer $L_3$ may be layer of silicon dioxide (SiO2) having a thickness $t_3 = 172$ nm and a refractive index of 1.45. However, this is not to be construed in a limiting sense since it is envisioned that the thickness and refractive index of each layer L and the material(s) or composition(s) forming each layer L may be selected for a particular application.

In this third instance of the optical polarizer assembly 2 shown in FIG. 6, the dielectric medium 22 in the grooves or trenches 18 and the superstrate (ambient medium) above and/or around the or dielectric ridges 4, made, for example, of Al, may be the ambient environment or ambient air having a refractive index of n of the ambient environment or ambient air. However, this is not to be construed in a limiting sense.

In this third instance of the optical polarizer assembly 2 shown in FIG. 6, A may have a value of 300 nm; w may have a value of 95 nm; and h may have a value of 500 nm. However, these values are not to be construed in a limiting sense since is it envisioned that one or more of these values may be different, e.g., one or more of these values may be selected based on the wavelength of the light beam to be propagated through the third instance optical polarizer assembly 2 shown in FIG. 6.

This third instance of the optical polarizer assembly 2 shown in FIG. 6 and described above has been estimated or determined to have an extinction ratio (ER)>50 dB, a transmissivity (T)=96% and a reflection loss (R) of 0.04%. In comparison, an optical polarizer assembly without the multi-layer substrate 8 may only provide a transmissivity (T) of about 74%.

With reference to FIGS. 7A-7C, each dielectric ridge 4 may have a cross-sectional shape different than the rectangular cross-sections shown in FIGS. 3 and 5. For example, FIG. 7A shows an isolated cross-section of a dielectric ridge 24 having spaced sides 12-1 and 12-2, including electrically conductive coatings 16-1 and 16-2, that converge from a larger bottom end to a smaller top 14. In a similar manner, each conductive ridge 24 shown in FIG. 6 may have spaced sides 26-1 and 26-2 that converge from a larger bottom end to a smaller top 14.

In another example, FIG. 7B shows an isolated cross-section of a dielectric ridge 24 having spaced sides 12-1 and 12-2, including electrically conductive coatings 16-1 and 16-2, that diverge from a smaller bottom end to a larger top 14. In a similar manner, each conductive ridge 24 shown in FIG. 6 may have spaced sides 26-1 and 26-2 that diverge from a smaller bottom end to a larger top 14.

In another example, FIG. 7C shows an isolated cross-section of a dielectric ridge 24 having spaced parallel or substantially parallel sides 12-1 and 12-2, including electrically conductive coatings 16-1 and 16-2, that extend from the bottom end to the top 14, that has rounded edges 28-1 and 28-2 proximate or adjacent the top 14. In a similar manner, each conductive ridge 24 shown in FIG. 6 may have spaced sides 26-1 and 26-2 that that extend from the bottom end to the top 14, that has rounded edges proximate or adjacent the top 14.

With reference to FIGS. 7D-7E, in some non-limiting embodiments or examples, each dielectric ridge 4 described in this disclosure may be comprised of multiple horizontal (FIG. 7D) or vertical (FIG. 7E) dielectric layers n3. The example dielectric ridges 4 shown in FIGS. 7D-7E include four dielectric layers n3-1 through n3-4. However, this is not to be construed in a limiting sense since it is envisioned that the dielectric ridge 4 shown in each of FIGS. 7D-7E may include any number of two or more dielectric layers n3. In the example dielectric ridges shown in FIGS. 7D-7E, each dielectric layer n3-1 through n3-4 may be made of the same or a different dielectric material as any other dielectric layer n3-1 through n3-4. Moreover, the thickness (FIG. 7D) or widths (FIG. 7E) of each dielectric layer n3-1 through n3-4 may be the same or different than the thickness or width of any other dielectric layer n3-1 through n3-4. A dielectric ridge 4 comprised of multiple layers of the same or different dielectric material(s) and/or layers having different widths or thicknesses of dielectric material(s) may be useful, e.g., optimized, for reduction of reflective losses by the dielectric ridge 4.

With reference to FIG. 8, in some non-limiting embodiments or examples, the dielectric ridges 4 having spaced sides 12-1 and 12-2, including electrically conductive coatings 16-1 and 16-2, may be spaced apart from each other by different distances or polarizer periods (Λ), i.e., by varying or chirped polarizer periods. FIG. 8 shows four dielectric ridges 24 having spaced sides 12-1 and 12-2, including electrically conductive coatings 16-1 and 16-2, separated by different distances $\Lambda_1$, $\Lambda_2$, and $\Lambda_3$. In a similar manner, each conductive ridge 24 (FIG. 6) having spaced sides 26-1 and 26-2 may be spaced apart from each other by different distances or polarizer periods (Λ), i.e., by varying or chirped polarizer periods. In FIG. 8, the dielectric medium 22 may be a solid or a gas, e.g., the ambient environment or ambient air.

With reference to FIGS. 9-11, in some non-limiting embodiments or examples, an optical polarizer in accordance with the principles of the present disclosure may include a pair of any one or combination of the optical polarizers 2 shown FIGS. 2-6 and 8 stacked one above or one on-top-of the other. Solely for the purpose illustration and not of limitation, a pair of the optical polarizers 2 of FIG. 3 or 5 may be described as being stacked one above or on-top-of the other. However, this is not to be construed in a limiting sense.

In an example shown in FIG. 9, an optical polarizer 2' may include a first arrangement comprising a pair of the optical polarizers 2-1 and 2-2 of FIG. 3 or FIG. 5 stacked one above or one on-top-of the other. In this example, the dielectric substrate 8-2 of the top one of the pair of the optical polarizers 2-2 is positioned or disposed between the elongated dielectric ridges 4-2 of the top one of the pair of the optical polarizers 2-2 and the elongated dielectric ridges 4-1 of a bottom one of the pair of the optical polarizers 2-1. The bottom one of the pair of the optical polarizers 2-1 has its dielectric substrate position 8-1 on a side of its elongated dielectric ridges 4-1 opposite the dielectric substrate 8-2 of the top one of the pair of the optical polarizers 2-2.

The dielectric substrate 8-1 of the optical polarizer 2-1 may comprise a single layer substrate, e.g., a layer $L_1$, or a multi-layer substrate comprising two, three, four or more layers, e.g., layers $L_1$ and $L_2$. Also or alternatively, the dielectric substrate 8-2 of optical polarizer 2-2 may comprise a single layer substrate, e.g., a layer $L_1$, or a multi-layer substrate comprising two, three, four or more layers, e.g., layers $L_1$ and $L_2$. The layer(s) $L_1$ and, if provided, $L_2$ of the dielectric substrates 8-1 and 8-2 may be of the same or different material(s) or compound.

The optical polarizer 2-1 may include an optional dielectric medium 22-1 between proximate or adjacent dielectric ridges 4-1. Also or alternatively, the optical polarizer 2-2 may include an optional dielectric medium 22-2 between proximate or adjacent dielectric ridges 4-2. Each dielectric medium 22-1 and 22-2 may be a solid, such as, for example, epoxy or SiO2, or a gas, such as, for example, ambient air or the ambient environment.

In a first example of the optical polarizer 2' of FIG. 9, each dielectric substrate 8-1 and 8-2 may be a single layer $L_1$ (i.e., layer $L_2$ is not present) made of silicon dioxide (SiO2) and the dielectric substrate 8-2 may have a thickness 31 of, for example, without limitation, about 1 μm. The dielectric media 22-1 and 22-2 may have a refractive index n=1.45. Moreover, the dielectric media 22-1 and 22-2 may optionally cover the ends of the dielectric ridges 4-1 and 4-2 and the ends of the electrically conductive coatings 16-1 and 16-2 on the sidewalls of the dielectric ridges 4-1 and 4-2 opposite the dielectric substrate 8-2. The electrically conductive coatings 16-1 and 16-2 on the sidewalls of the dielectric ridges 4-1 and 4-2 of the optical polarizers 2-1 and 2-2 may be made of aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the electrically conductive coatings 16-1 and 16-2 because of their low oxidation.

A second example of the optical polarizer 2' of FIG. 9 may, with the following exception, be the same as the first example described immediately above. The exception in this second example may be that the dielectric substrate 8-1 is omitted.

The transmissivity T of light passing through theses first and second example optical polarizers 2', e.g., from the bottom to the top, or vice versa, may change minimally due to low reflectivity. The extinction ratio (ER) or contrast of light passing through these first and second example optical polarizers 2', however, may depend on the thickness 31 of the single layer $L_1$ dielectric substrate 8-2. In an example, changing the thickness 31 of the single layer $L_1$ dielectric substrate 8-2 may produce a change in ER or contrast of $\pm 12$ decibels (dB).

More specifically, in these first and second example optical polarizers 2' of FIG. 9, the optical polarizers 2-1 and 2-2 may act as reflectors in the nature of a Fabry Perot cavity/resonator (etalon) with a free spectral range of $\Delta \lambda = \lambda^2/(2 \, n \, L)$, where $\lambda$ is the wavelength of light passing through the optical polarizer 2', L is the thickness 31 of the single layer $L_1$ dielectric substrate 8-2, and n is the refractive index of the single layer substrate $L_1$ dielectric substrate 8-2, e.g., n=1.45 if the single layer substrate $L_1$ dielectric substrate 8-2 is made of SiO2. To improve the ER or contrast of these first and second example optical polarizers 2', the thickness 31 of the single layer $L_1$ dielectric substrate 8-2 may be chosen such that for light of wavelength $\lambda$ the cavity is anti-resonant, i.e. mid-way between the cavity's resonances. In this example, the transmission of any rejected polarization is additionally suppressed beyond the suppression of the top and bottom optical polarizers 2-2 and 2-1 of these first and second example optical polarizers 2'. The ER of contrast will be maintained with acceptable uniformity over a wavelength range that may be 20-30% of the cavity's free spectral range.

In an example, one or both of the optical polarizers 2-1 and 2-2 shown in FIG. 9 may be replaced with the optical polarizer shown in FIG. 6 having conductive ridges and a multi-layer substrate.

In another example shown in FIG. 10, an optical polarizer 2" may include a second arrangement comprising a pair of the optical polarizers 2-1 and 2-2 of FIG. 3 or 5 stacked one above or one on-top-of the other with the elongated dielectric ridges 4-1 and 4-2 of the pair of the optical polarizers 2-1 and 2-2 positioned or disposed in an interleaved or interdigitated manner. In an example, each optical polarizer 2-1 and 2-2 may include its electrically conductive coatings 16-1 and 16-2 on the sides of each dielectric ridge 4 thereof, whereupon when the optical polarizers 2-1 and 2-2 are stacked with the elongated dielectric ridges 4-1 and 4-2 positioned or disposed in an interleaved or interdigitated manner, the electrically conductive coatings 16 of immediately proximate or adjacent ridges 4-1 and 4-2 may, as shown in FIG. 10, be separated by a gap or space 29. Moreover, it is envisioned that the electrically conductive coatings 16-1 and 16-2 on the sides of each dielectric ridge 4 of one of the optical polarizers, e.g., optical polarizer 2-1, may be omitted, whereupon the electrically conductive coatings 16-1 and 16-2 on the sides of each dielectric ridge 4 of the other optical polarizer, e.g., optical polarizer 2-2, may be positioned or disposed between the interleaved or interdigitated dielectric ridges 4-1 and 4-2 of the optical polarizers 2-1 and 2-2.

Another example optical polarizer 2'" shown in FIG. 11, is, with the following exception, similar to the first arrangement of the optical polarizers 2' shown in FIG. 9. The exception is that the dielectric substrate 8-2 of the top one of the pair of the optical polarizers 2-2 may have a reduced thickness versus the dielectric substrate 8-1 of the bottom one of the pair of the optical polarizers 2-1. The dielectric substrate 8-2 may be a single or multi-layer substrate. The dielectric substrate 8-1 may be a single or multi-layer substrate. In an example, the dielectric substrate 8-1 may be a multi-layer substrate and the dielectric substrate 8-1 may be a single layer substrate.

In the example optical polarizers 2', 2" and 2'" shown in FIGS. 9-11, the dielectric ridges 4-1 and 4-2 may have the same or different: duty cycles; groove or trench 18 depths; and/or thicknesses of electrically conductive coatings 16-1 and 16-2.

With reference to FIGS. 12 and 13, in some non-limiting embodiments or examples, another example optical polarizer 2 in accordance with the principles of the present disclosure may include: (1) a layer 30 of electrically conductive strips 32 positioned or disposed between the dielectric substrate 8 and the plurality of dielectric ridges 4 (FIG. 12), or (2) a layer 30 of electrically conductive strips 32 positioned or disposed above the plurality of dielectric ridges 4 (FIG. 13). Each dielectric ridge 4 may include electrically conductive coatings 16-1 and 16-2 on its spaced sides 12-1 and 12-2. In these examples, each layer 30 of electrically conductive strips 32 may include dielectric material 34 supporting the electrically conductive strips 32. In an example, the electrically conductive strips 32 may be formed of aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the electrically conductive strips 32 because of their low oxidation.

A length direction of the electrically conductive strips 32 may run or extend parallel with the length directions of the dielectric ridges 4, i.e., into the pages of FIGS. 12 and 13. A width w of each electrically conductive strip 32 may be less than a width W of each dielectric ridge 4. A dielectric medium 22 (e.g., a solid, such as, for example, epoxy or SiO2, or a gas, such as, for example, ambient air or the ambient environment) may surround the dielectric ridges 4, filling in the grooves or trenches 18 between proximate or adjacent ridges 4. The example of FIG. 13 shows the layer 30 of electrically conductive strips 32 spaced from the tops 14 of the ridges 4 by the dielectric medium 22. In this example, the dielectric medium 22 may be a solid such, for example, as epoxy or SiO2. However, this is not to be construed in a limiting sense since it is envisioned that the layer 30 of electrically conductive strips 32 in FIG. 13 may disposed or positioned directly in contact with the tops 14 of the dielectric ridges 4 and the dielectric medium 22 may be omitted or may be a solid, such as, for example, epoxy or SiO2, or a gas, such as, for example, ambient air or the ambient environment.

Each dielectric substrate 8 in FIGS. 12 and 13 may be single layer dielectric substrate 8 or a multi-layer dielectric substrate 8 comprising two, or three, or more layers. In an example, the dielectric substrates 8 in FIGS. 12 and 13 may be a multi-layer dielectric substrate 8 including, from the bottom to the top in the figures, layers $L_1$, $L_2$, and $L_3$. In an example, layer $L_1$ may be a layer of silicon (Si); layer $L_2$ may be a layer of zinc selenide (ZnSe) between layer $L_1$ of silicon (Si) and the plurality of elongated conductive ridges 4; and a layer $L_3$ of magnesium fluoride (MgF2) between the layer $L_2$ of zinc selenide (ZnSe) and the plurality of elongated conductive ridges 4.

With reference to FIG. 14 and with continuing reference to FIG. 13, in some non-limiting embodiments or examples, another example optical polarizer 2 in accordance with the principles of the present disclosure may include a plurality of dielectric ridges 4', including electrically conductive coatings 16-1' and 16-2', positioned above the layer 30 of conductive strips 32 of the example optical polarizer 2 of FIG. 13 which is copied or reproduced in FIG. 14. In an example, the electrically conductive coatings 16-1' and 16-2' may be made of aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the electrically conductive coatings 16-1' and 16-2' because of their low oxidation. Because the above description of the optical polarizer 2 shown in FIG. 13 also applies to the copy of the optical polarizer 2 of FIG. 13 reproduced in FIG. 14, details regarding the copy of the optical polarizer 2 of FIG. 13 reproduced in FIG. 14 will not be described in connection with FIG. 14 to avoid unnecessary redundancy.

Positioned above the dielectric ridges 4' is a layer 30' of electrically conductive strips 32'. This layer 30' may include dielectric material 34' supporting the electrically conductive strips 32'. A length direction of the electrically conductive strips 32' may run or extend parallel with the length directions of the dielectric ridges 4', i.e., into the page of FIG. 14. A width w' of each electrically conductive strip 32' may be less than a width W' of each dielectric ridge 4'. In an example, the electrically conductive strips 32' may be made of aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the electrically conductive strips 32' because of their low oxidation.

A dielectric medium 22' (e.g., a solid, such as, for example, epoxy or SiO2, or a gas, such as, for example, ambient air or the ambient environment) may surround the ridges 4', filling in the grooves or trenches 18' between proximate or adjacent ridges 4'. The example of FIG. 14 shows the layer 30' of electrically conductive strips 32' spaced from the tops 14' of the ridges 4'. In this example, the dielectric medium 22' may be a solid such, for example, as epoxy or SiO2. However, this is not to be construed in a limiting sense since it is envisioned that layer 30' of electrically conductive strips 32' in FIG. 14 may disposed or positioned directly in contact with the tops 14' of the ridges 4', whereupon any remaining dielectric medium 22' may be omitted or may be a solid, such as, for example, epoxy or SiO2, or a gas, such as, for example, ambient air or the ambient environment.

Also, while FIG. 14 shows the bottoms 15' of the ridges 4' spaced from the top of layer 30 by the dielectric medium 22', which, in an example, may be a solid such as, for example, an epoxy or SiO2, this is not to be construed in a limiting sense since it is envisioned that bottoms 15' of the ridges 4' may be disposed or positioned directly in contact with the top of layer 30, whereupon and any remaining dielectric medium 22' may be omitted or may be a solid, such as, for example, epoxy or SiO2, or a gas, such as, for example, ambient air or the ambient environment.

The dielectric ridges 4' including electrically conductive coatings 16-1' and 16-2' may be vertically aligned or (as shown in FIG. 14) may be horizontally offset with the dielectric ridges 4 including electrically conductive coatings 16-1 and 16-2. The conductive strips 32' of layer 30' may (as shown in FIG. 14) be vertically aligned or may be horizontally offset with the conductive strips 32 of layer 30.

In an example, in FIG. 14, the material forming like-numbered elements (with or without the """, e.g., 4 and 4') may be the same. However, this is not to be construed in a limiting sense since it is envisioned that, in FIG. 14, the materials forming each of the following sets (e.g., pairs) of like numbered elements (with or without the """, e.g., 4 and 4') may be the same or different: dielectric media 22 and 22'; ridges 4 and 4'; conductive strips 32 and 32'; dielectric media 34 and 34'; dielectric media 22, 22', 34 and 34'; conductive coatings 16-1 and 16-2; conductive coatings 16-1' and 16-2'; and conductive coatings 16-1, 16-1', 16-2 and 16-2'.

With reference to FIG. 15, in some non-limiting embodiments or examples, an example optical polarizer 2 in accordance with the principles of the present disclosure may include the substrate 8 including or defining a frame 36 (which is part of the substrate) that is devoid of dielectric ridges 4, that completely surrounds the plurality of elongated (straight or curved) dielectric ridges 4, including the electrically conductive coatings 16-1 and 16-2 of FIGS. 2-5 and 7A-8 or the conductive ridges 24 of FIG. 6. The frame 36 in combination with a passivation layer 38 disposed on the substrate and the dielectric ridges 4, including the electrically conductive coatings 16-1 and 16-2, or the conductive ridges 24 avoids corrosion, especially at the ends 40-1 and 40-2, of the electrically conductive coatings 16-1 and 16-2 on the dielectric ridges 4 of FIGS. 2-5 and 7A-8 or the ends 40-1 and 40-2 of the conductive ridges 24 of FIG. 6.

With reference to FIGS. 16-18, in some non-limiting embodiments or examples, example optical polarizers 2 in accordance with the principles of the present disclosure may include one or more interruptions or gaps 42 in each dielectric ridge 4 and the electrically conductive coatings 16-1 and 16-2 on the sides thereof (FIGS. 2-5 and 7A-8) or in each conductive ridge 24 (FIG. 6). Each interruption or gap 42 in each dielectric ridge 4 and the electrically conductive coatings 16-1 and 16-2 on the sides thereof (FIGS. 2-5 and 7A-8) electrically isolate the electrically conductive coatings 16-1 and 16-2 on the sections of said elongated dielectric ridge on either side of said interruption or gap 42 thereby avoiding the propagation of any corrosion from the electrically conductive coating(s) 16-1 and/or 16-2 on one side of the interruption or gap 42 to the electrically conductive coating(s) 16-1 and/or 16-2 on the other side the interruption or gap 42. Similarly, each interruption or gap 42 in each conductive ridge 24 (FIG. 6) avoids the propagation of any corrosion from the section of the conductive ridge 24 on one side of the interruption or gap 42 to the section of the conductive ridge 24 on the other side the interruption or gap 42.

In FIGS. 15-18, the electrically conductive coatings 16-1 and 16-2 on the sides of the dielectric ridges 4 or sections of dielectric ridges 4 are omitted for the purpose of simplicity. However, with an exception described next, it is to be understood that each dielectric ridge 4 or section of dielectric ridge 4 described herein includes the electrically conductive coatings 16-1 and 16-2 on the sides thereof as shown, for example, in FIGS. 2-5 and 7A-8.

The exception, shown in FIG. 15, is that each dielectric ridge 4 or section of dielectric ridge 4 may be continuous while the electrically conductive coatings 16-1 and 16-2 on the sides thereof may include one or more interruptions or gaps. This is illustrated in FIG. 15 for a single exemplary dielectric ridge 4A that includes on the sides thereof electrically conductive coatings 16-1A and 16-2A, each of which includes one or more interruptions or gaps 46. While the one more interruptions or gaps 46 in conductive coatings 16-1A and 16-2A is illustrated in connection with a single exemplary dielectric ridge 4A in FIG. 15, it is to be understood that any number of the dielectric ridges 4 or sections of dielectric ridges 4 shown in any one of FIGS. 15-18 may include the one more interruptions or gaps 46 in their conductive coatings. In an example, the electrically conductive coatings 16-1A and 16-2A may be made of aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the electrically conductive coatings 16-1A and 16-2A because of their low oxidation.

Referring to FIGS. 16 and 17, in some examples, the interruption or gaps 42 in adjacent or proximate dielectric ridges 4 and the electrically conductive coatings 16-1 and 16-2 on the sides thereof (FIGS. 2-5 and 7A-8) or in adjacent or proximate conductive ridges 24 (FIG. 6) may form one or more lines 44 of interruptions or gaps 42 that may run parallel to each other and which may run transverse (FIG. 16) or perpendicular (FIG. 17) to the length direction of the plurality of the ridges 4/24.

In another example shown in FIG. 18, the interruptions or gaps 42 in adjacent or proximate dielectric ridges 4 and the electrically conductive coatings 16-1 and 16-2 on the sides thereof (FIGS. 2-5 and 7A-8) or the interruptions or gaps 42 in adjacent or proximate conductive ridges 24 (FIG. 6) may be arranged in a random or offset pattern.

With reference to FIGS. 19-21, and with continuing reference to FIGS. 2-5 and 7A-8, an optical isolator 50 in accordance with the principles of the present disclosure may include: a polarizer 52, having a first polarization axis 54 (e.g., at 00), for directly receiving an optical signal 56 from an optical signal source and for outputting at least a part 60 of the optical signal; a Faraday rotator 58 for directly receiving and for rotating a polarization of the at least part 60 of the optical signal output by the polarizer 52, and for outputting at least a part thereof as a rotator output optical signal 62; and a second polarizer, sometimes referred to as an analyzer 64, having a second polarization axis 66 (e.g., at 45°), for directly receiving the rotator output optical signal 62 and for outputting at least a part 68 thereof. The polarizer 52 and the analyzer 64 are coupled to opposed, opposing, or opposite surfaces of the Faraday rotator 58. In an example, the Faraday rotator may be a garnet, such as, for example, without limitation, a bismuth iron garnet, a terbium gallium garnet, or an yttrium iron garnet. As is known in the art, the Faraday rotator 58 may either operate in the presence of an externally applied magnetic field (not shown) or the Faraday rotator 58 may be a "self-latching" type.

The polarizer 52 may comprise or be formed from one of the optical polarizers 2 shown in any one of FIGS. 2-5 and 7A-8. The analyzer 64 may comprise or be formed from one of the optical polarizers 2 shown in any one of FIGS. 2-5 and 7A-8. The optical polarizer 2 comprising or forming the polarizer 52 may be the same or different than the optical polarizer 2 comprising or forming the analyzer 64. Moreover, in some non-limiting embodiments or examples, an optical isolator 50 in accordance with the principles of the present disclosure may include only single polarizer, e.g., the polarizer 52, or a pair of polarizers, e.g., the polarizer 52 and the analyzer 64.

In the example optical isolator 50 shown in FIG. 19, the optical polarizer 2 comprising the polarizer 52 may include the tops 14 of its plurality of spaced elongated dielectric ridges 4 coupled (e.g., via an adhesive 70, such as, for example, an index matching epoxy) directly to one (e.g., the bottom one) of the opposing surfaces of the Faraday rotator 58 with its dielectric substrate 8 (shown in phantom in FIG. 19) disposed or positioned on a side of its elongated dielectric ridges 4 opposite the Faraday rotator 58. Moreover, the optical polarizer 2 comprising the analyzer 64 may include the tops 14 of its plurality of spaced elongated dielectric ridges 4 coupled (e.g., via an adhesive 70, such as, for example, an index matching epoxy) directly to the other (e.g., the top one) of the opposing surfaces of the Faraday rotator 58 with its dielectric substrate 8 (also shown in phantom in FIG. 19) disposed or positioned on a side of its elongated dielectric ridges 4 opposite the Faraday rotator 58. It is to be understood that the optical polarizers 2 comprising the polarizer 52 and the analyzer 64 include the electrically conductive coatings 16-1 and 16-2 on the sides of each dielectric ridge 4. In an example, the electrically conductive coatings 16-1 and 16-2 may be made of aluminum (Al), copper (Cu), Silver (Si), gold (Au), platinum (Pt), palladium (Pd), iridium (Ir), osmium (Os), rhodium (Rh), ruthenium (Ru), or an alloy or amalgamation thereof, or any other suitable and/or desirable conductive material(s) or compound. In an example, gold (Au), platinum (Pt), palladium (Pd), iridium (Ir), osmium (Os), rhodium (Rh), and ruthenium (Ru), or an alloy or amalgamation thereof, are desirable for the electrically conductive coatings 16-1 and 16-2 because of their low oxidation.

Once the tops 14 of the dielectric ridges 4 of the optical polarizers 2 comprising the polarizer 52 and the analyzer 64 are coupled to the opposing surfaces of the Faraday rotator 58, their dielectric substrates 8 may be removed, e.g., via an isotropic wet etch, laser ablation or via back grinding followed by chemical-mechanical polishing.

With reference to FIG. 20, in some non-limiting embodiments or examples, another optical isolator 50 in accordance with the principles of the present disclosure may, with the following exceptions, be the same as the optical isolator 50 shown in FIG. 19. In the optical isolator 50 shown in FIG. 20, the substrate 8 of the analyzer 64 is retained (not removed) and a wave plate 72 is coupled to a side of the substrate 8 of the analyzer 64 opposite the Faraday rotator 58. In an example, the wave plate 72 may be a half ($\lambda$/2) wave plate and/or the wave plate 72 may have a fast axis 74 oriented at 22.5° with respect to a polarization direction of the second polarization axis 66. In an example, the optical signal 68 exiting the optical isolator 50 of FIG. 20 may have a polarization direction 76 that is the same as the polarization direction of the at least part 60 of the optical signal output by the polarizer 52 into the Faraday rotator 58.

With reference to FIG. 21, in some non-limiting embodiments or examples, another optical isolator 50 in accordance with the principles of the present disclosure may include (from bottom to top in FIG. 21) a polarizer 52, a Faraday rotator 58, and an analyzer 64. In FIG. 21, each of the polarizer 52 and the analyzer 64 are illustrated, strictly for the purpose of illustration, as comprising the optical polarizer 2 shown in FIG. 5. However, this is not to be construed in a limiting sense since it is envisioned that the polarizer 52 may comprise any one of the optical polarizers 2 shown in FIGS. 2-5 and 7A-8 and/or the analyzer 64 may comprise any one of the optical polarizers 2 shown in FIGS. 2-5 and 7A-8.

In this example, the substrates 8 of the optical polarizers 2 comprising the polarizer 52, having polarization axis 54 (e.g., 0°), and the analyzer 64, having a different polarization axis 78 (e.g., 45°), may be coupled (via an adhesive) directly to or deposited on the opposing surfaces of the Faraday rotator 58 with their respective dielectric ridges 4, including electrically conductive coatings 16-1 and 16-2 on the sides thereof, disposed or positioned to the sides of the substrates 8 opposite the Faraday rotator 58.

In the example optical isolators 50 shown in FIGS. 19-21, each substrate 8 may comprise one or more layers L. At least one of the layers L of each substrate 8 may comprise silicon dioxide ($SiO_2$). Moreover, the orientation of the dielectric ridges 4 and/or the electrically conductive coatings 16-1 and 16-2 in FIGS. 19-21 are shown strictly for the purpose of illustration and are not to be construed in a limiting sense.

The example optical isolators 50 shown in FIGS. 19-21 may optionally include the dielectric medium 22 at least between proximate or adjacent dielectric ridges 4, including the electrically conductive coatings 16-1 and 16-2 on the sides of each dielectric ridge 4.

With ongoing reference to FIGS. 19-21, and with continuing reference to FIGS. 2-5 and 7A-8, a method of forming an optical isolator 50 in accordance with the principles of the present disclosure may comprise: (a) providing a polarizer 52 and an analyzer 64 each comprising: a dielectric substrate 8, a plurality of spaced elongated dielectric ridges 4 positioned or disposed on a surface of the dielectric substrate 8, wherein each dielectric ridge 4 has a length direction [curved or straight] that extends along the surface of the dielectric substrate 8 and each dielectric ridge 4 includes a pair of spaced sides 12-1 and 12-2 that extend away from, e.g., transverse or perpendicular, the surface of the dielectric substrate and a top 14 spaced from the surface of the dielectric substrate 8 and extending between the spaced sides 12-1 and 12-2 opposite the surface of the dielectric substrate 8, and an electrically conductive coating 16-1 and 16-2 on each side 12-1 and 12-2 of each dielectric ridge 4; (b) coupling the dielectric ridges 4 of the polarizer 52 to one surface of a Faraday rotator 58; and (c) coupling the dielectric ridges 4 of the analyzer 64 to an opposing surface of the Faraday rotator 58.

The method may include at least one of: (1) step (b) may include coupling the tops 14 of the dielectric ridges 4 of the polarizer 52 to the one surface of the Faraday rotator 58 with the dielectric substrate 8 of the polarizer 52 spaced from the one surface of the Faraday rotator 58 and removing at least a portion of the dielectric substrate 8 of the polarizer 52; and/or (2) step (c) may include coupling the tops 14 the dielectric ridges 4 of the analyzer 64 to the opposing surface of the Faraday rotator 58 with the dielectric substrate 8 of the polarizer 52 spaced from the opposing surface of the Faraday rotator 58 and removing at least a portion of the dielectric substrate of the analyzer.

The method may include coupling a wave plate to the dielectric ridges 4 of the analyzer 64 via a remainder of the dielectric substrate 8 of the analyzer that was removed in step (2). The wave plate may be a half ($\lambda/2$) wave plate and/or the wave plate may have a fast axis oriented at 22.5° with respect to a polarization axis of the analyzer 64.

The method may include at least one of: (1) step (b) includes coupling the dielectric ridges 4 of the polarizer 52 to the one surface of the Faraday rotator 58 via the dielectric substrate 8 of the polarizer 52; and/or (2) step (c) includes coupling the dielectric ridges 4 of the analyzer 64 to the opposing surface of the Faraday rotator 58 via the dielectric substrate 8 of the polarizer.

The method may include the Faraday rotator 58 being a garnet, such as bismuth iron garnet, a terbium gallium garnet, or an yttrium iron garnet.

The method may include at least one of: the coupling of step (b) may be via a first adhesive or via a first substrate; and the coupling of step (c) may be via a second adhesive or via a second substrate, wherein the first and second adhesives may be the same or different.

The method may include at least one of the first and second adhesives being an index matching epoxy.

The method may include at least one of the first and second dielectric substrates 8 comprising one or more layers. At least one of the one or more layers of the dielectric substrate 8 may comprise silicon dioxide ($SiO_2$).

Other non-limiting examples or aspects are set forth in the following illustrative and exemplary numbered clauses:

Clause 1. An optical polarizer comprising: a dielectric substrate; a plurality of elongated dielectric ridges positioned or disposed in spaced relation on a surface of the substrate, wherein each dielectric ridge has a length direction [curved or straight] that extends along the surface of the substrate and each dielectric ridge includes a pair of spaced sides that extend away from, e.g., transverse or perpendicular, the surface of the substrate and a top extending between the spaced sides opposite the surface of the substrate; and an electrically conductive coating on each side of each dielectric ridge.

Clause 2: The optical polarizer of clause 1, wherein the electrically conductive coating on each side of each dielectric ridge comprises one or more of aluminum (Al), copper (Cu), Silver (Si), gold (Au), platinum (Pt), palladium (Pd), iridium (Ir), osmium (Os), rhodium (Rh), and ruthenium (Ru), or an alloy or amalgamation thereof.

Clause 3: The optical polarizer of clause 1 or 2, wherein each dielectric ridge has a quadrilateral or rectangular cross-section.

Clause 4: The optical polarizer of any one of clauses 1-3, wherein: the dielectric substrate has refractive index of $n_1$; the dielectric ridges have a refractive index of $n_2$; and $n_1 = n_2$ or $n_1 \neq n_2$.

Clause 5: The optical polarizer of any one of clauses 1-4, further including a groove or trench between the electrically conductive coatings on the facing sides of adjacent or proximate pairs of dielectric ridges; and a dielectric having a refractive index of $n_3$ in at least each groove or trench.

Clause 6: The optical polarizer of any one of clauses 1-5, wherein: $n_1 = n_2 = n_3$; or a refractive index of at least one or $n_1$, $n_2$ and $n_3$ is different.

Clause 7: The optical polarizer of any one of clauses 1-6, wherein the dielectric substrate and the dielectric ridges are formed of $SiO_2$.

Clause 8: The optical polarizer of any one of clauses 1-7, wherein the dielectric substrate, the dielectric ridges, and the dielectric in the at least each groove or trench are all formed of $SiO_2$.

Clause 9: The optical polarizer of any one of clauses 1-8, wherein the dielectric in the at least each groove or trench also covers the tops of the plurality of elongated dielectric ridges.

Clause 10: The optical polarizer of any one of clauses 1-9, wherein the dielectric substrate is a multi-layer dielectric substrate.

Clause 11: The optical polarizer of any one of clauses 1-10, wherein the multi-layer dielectric substrate comprises: a layer of silicon (Si); a layer of zinc selenide (ZnSe) between the layer of silicon (Si) and the plurality of dielectric ridges; and a layer of magnesium fluoride (MgF2) between the layer of zinc selenide (ZnSe) and the plurality of dielectric ridges.

Clause 12: The optical polarizer of any one of clauses 1-11, wherein a spacing between the plurality of dielectric ridges including the electrically conductive coating on each side of each dielectric ridge is one of: constant; or variable/ chirped.

Clause 13: The optical polarizer of any one of clauses 1-12, further including at least one of: a layer of electrically conductive strips positioned or disposed between the dielectric substrate and the plurality of dielectric ridges parallel with the length directions of the dielectric ridges; or a layer of electrically conductive strips positioned or disposed above the plurality of dielectric ridges parallel with the length directions of the dielectric ridges.

Clause 14: The optical polarizer of any one of clauses 1-13, wherein a width of each electrically conductive strip is less than a width of each dielectric ridge.

Clause 15: The optical polarizer of any one of clauses 1-14, further including: a pair of layers of electrically conductive strips positioned or disposed, one above the other, above the tops of the plurality of dielectric ridges; and a second plurality of elongated dielectric ridges including, on each side of each dielectric ridge of the second plurality of dielectric ridges an electrically conductive coating, positioned or disposed between the pair of layers of electrically conductive strips.

Clause 16: The optical polarizer of any one of clauses 1-15, wherein, at least one of the following: the dielectric ridges of the second plurality of dielectric ridges are positioned or disposed offset or not in alignment with the dielectric ridges positioned or disposed in spaced relation on the surface of the dielectric substrate; and the electrically conductive strips of the pair of layers of electrically conductive strips positioned or disposed, one above the other, above the tops of plurality of dielectric ridges positioned or disposed in spaced relation on a surface of the dielectric substrate, are positioned or disposed offset or not in alignment with each other.

Clause 17: The optical polarizer of any one of clauses 1-16, wherein a width of each electrically conductive strip is less than a width of each dielectric ridge.

Clause 18: The optical polarizer of any one of clauses 1-17, further including one or more interruptions or gaps in each elongated dielectric ridge and the electrically conductive coating on each side of said dielectric ridge that electrically isolate the electrically conductive coatings on the sections of said elongated dielectric ridge on either side of said interruption or gap.

Clause 19. The optical polarizer of any one of clauses 1-18, wherein, at least one of: the interruptions or gaps in adjacent or proximate dielectric ridges and the electrically conductive coatings on the sides of said dielectric ridges form one or more lines of interruptions or gaps that extend perpendicular to the length directions of the plurality of dielectric ridges and the electrically conductive coatings on the sides of each dielectric ridge; or the interruptions or gaps in adjacent or proximate dielectric ridges and the electrically conductive coatings on the sides of said dielectric ridges form one or more lines of interruptions or gaps that extend transverse to the length directions of the plurality of dielectric ridges and the electrically conductive coatings on the sides of each dielectric ridge; or the interruptions or gaps in adjacent or proximate dielectric ridges and the electrically conductive coating on the sides of said dielectric ridges are disposed or positioned in a random or offset pattern.

Clause 20: An optical polarizer comprising a multi-layer dielectric substrate and a plurality of elongated conductive ridges positioned or disposed in spaced relation on a surface of the multi-layer dielectric substrate. In an example, the plurality of elongated conductive ridges may comprise one or more of aluminum (Al), copper (Cu), Silver (Si), gold (Au), platinum (Pt), palladium (Pd), iridium (Ir), osmium (Os), rhodium (Rh), and ruthenium (Ru), or an alloy or amalgamation thereof.

Clause 21: The optical polarizer of clause 20, wherein the multi-layer dielectric substrate comprises: a layer of silicon (Si); a layer of zinc selenide (ZnSe) between the layer of silicon (Si) and the plurality of conductive ridges; and a layer of magnesium fluoride (MgF2) between the layer of zinc selenide (ZnSe) and the plurality of conductive ridges.

Clause 22: The optical polarizer of clause 20, wherein the multi-layer dielectric substrate comprises: a layer of fused silica (FS); a layer of tantalum pentoxide (Ta2O5) between the layer of fused silica (FS) and the plurality of conductive ridges; and a layer of magnesium fluoride (MgF2) between the layer of tantalum pentoxide (Ta2O5) and the plurality of conductive ridges.

Clause 23: The optical polarizer of clause 20, wherein the multi-layer dielectric substrate comprises: a bottom layer of silicon dioxide ($SiO_2$); a layer of zinc selenide (ZnSe) between the bottom layer of silicon dioxide ($SiO_2$) and the plurality of conductive ridges; an intermediate layer of silicon dioxide ($SiO_2$) between the layer of zinc selenide (ZnSe) and the plurality of conductive ridges; and a top layer of zinc sulfide (ZnS) between the intermediate layer of silicon dioxide ($SiO_2$) and the plurality of conductive ridges.

Clause 24: The optical polarizer of clause 23, further including a dielectric material positioned or disposed on the top layer of zinc sulfide (ZnS) at least between the plurality of conductive ridges.

Clause 25: The optical polarizer of clause 24, wherein the dielectric material is epoxy or $SiO_2$.

Clause 26: The optical polarizer of clause 24 or 25, wherein the dielectric material has a refractive index (n) of 1.54.

Clause 27: The optical polarizer of any one of clauses 20-26, further including one or more interruptions or gaps in each conductive ridge that electrically isolate sections of the elongated conductive ridge on either side of each interruption or gap.

Clause 28: The optical polarizer of any one of clauses 20-27, wherein, at least one of: the interruptions or gaps in adjacent or proximate conductive ridges form one or more lines of interruptions or gaps that extend perpendicular to the plurality of conductive ridges; or the interruptions or gaps in adjacent or proximate conductive ridges form one or more lines of interruptions or gaps that extend transverse to the plurality of elongated conductive ridges; or the interruptions or gaps in adjacent or proximate conductive ridges are disposed or positioned in a random or offset pattern.

Clause 29: An optical polarizer comprising a pair of the optical polarizers of any one of clauses 1-19 stacked one above the other comprising one of: (a) a first arrangement of the optical polarizers with the dielectric substrate of a top or upper one of the pair of the optical polarizers positioned or disposed between the dielectric ridges of the top or upper one of the pair of the optical polarizers and the dielectric ridges of a bottom one of the pair of the optical polarizers which has its dielectric substrate position on a side of its dielectric ridges opposite the dielectric substrate of the top one of the pair of the optical polarizers; or (b) a second arrangement of the optical polarizers with the dielectric ridges of the pair of the optical polarizers positioned or disposed in an interleaved or interdigitated manner.

Clause 30: The optical polarizer of clause 29, wherein at least one of the dielectric substrates is a multi-layer dielectric substrate.

Clause 31: The optical polarizer of clause 29 or 30, wherein, in the first arrangement of the optical polarizers, the substrate of the top one of the pair of the optical polarizers has a reduced thickness versus the substrate of the bottom one of the pair of the optical polarizers.

Clause 32: The optical polarizer of any one of clauses 29-31, wherein: the substrate of the bottom one of the pair of the optical polarizers is a multi-layer substrate; and the substrate of the top one of the pair of the optical polarizers is a single layer substrate.

Clause 33. The optical polarizer of any one of clauses 1-32, wherein the substrate has the form of a frame that completely surrounds the plurality of elongated dielectric ridges.

Clause 34: An optical isolator comprising; a polarizer, having a first polarization axis, for directly receiving an optical signal from an optical signal source and for outputting at least a part of the optical signal; a Faraday rotator for directly receiving and for rotating a polarization of the at least part of the optical signal output by the polarizer, and for outputting at least a part thereof as a rotator output optical signal; and an analyzer, having a second polarization axis, for directly receiving the rotator output optical signal and for outputting at least a part thereof, wherein: the polarizer and the analyzer are coupled to opposed surfaces of the Faraday rotator; and each of the polarizer and the analyzer comprise: a plurality of spaced elongated dielectric ridges coupled to one of the surfaces of the Faraday rotator; each dielectric ridge has a length direction [curved or straight] that extends along the one surface of the Faraday rotator; each dielectric ridge includes a pair of spaced sides that extend away from, e.g., transverse or perpendicular, the one surface of the Faraday rotator and a top that extends between the spaced sides and is directly coupled to the one surface of the Faraday rotator; and each dielectric ridge includes an electrically conductive coating on each side of the dielectric ridge. In an example, the electrically conductive coating on each side of each dielectric ridge may comprise one or more of aluminum (Al), copper (Cu), Silver (Si), gold (Au), platinum (Pt), palladium (Pd), iridium (Ir), osmium (Os), rhodium (Rh), and ruthenium (Ru), or an alloy or amalgamation thereof.

Clause 35: The optical isolator of clause 34, wherein the plurality of spaced elongated dielectric ridges of at least one of the polarizer and the analyzer are coupled to the one surface of the Faraday rotator via an adhesive or via a substrate.

Clause 36: The optical isolator of clause 34 or 35, wherein the Faraday rotator is a garnet, such as bismuth iron garnet, a terbium gallium garnet, or an yttrium iron garnet Clause 37: The optical isolator of any one of clauses 34-36, wherein the adhesive is an index matching epoxy.

Clause 38: The optical isolator of any one of clauses 34-37, further including a wave plate coupled to the tops of the dielectric ridges of the analyzer.

Clause 39: The optical isolator of any one of clauses 34-38, wherein the wave plate is a half ($\lambda$/2) wave plate.

Clause 40: The optical isolator of any one of clauses 34-39, wherein the wave plate has a fast axis oriented at 22.5° with respect to the second polarization axis.

Clause 41: The optical isolator of any one of clauses 34-40, wherein the substrate comprises one or more layers.

Clause 42: The optical isolator of any one of clauses 34-41, wherein the one or more layers comprise silicon dioxide ($SiO_2$).

Clause 43: A method of forming an optical isolator comprising: (a) providing a polarizer and an analyzer each comprising: a dielectric substrate, a plurality of spaced elongated dielectric ridges positioned or disposed on a surface of the dielectric substrate, wherein each dielectric ridge has a length direction [curved or straight] that extends along the surface of the dielectric substrate and each dielectric ridge includes a pair of spaced sides that extend away from, e.g., transverse or perpendicular, the surface of the dielectric substrate and a top spaced from the surface of the dielectric substrate and extending between the spaced sides opposite the surface of the dielectric substrate, and an electrically conductive coating on each side of each dielectric ridge; (b) coupling the dielectric ridges of the polarizer to one surface of a Faraday rotator; and (c) coupling the dielectric ridges of the analyzer to an opposing surface of the Faraday rotator. In an example, the electrically conductive coating on each side of each dielectric ridge may comprise one or more of aluminum (Al), copper (Cu), Silver (Si), gold (Au), platinum (Pt), palladium (Pd), iridium (Ir), osmium (Os), rhodium (Rh), and ruthenium (Ru), or an alloy or amalgamation thereof.

Clause 44: The method of clause 43, including at least one of: (1) wherein step (b) includes coupling the tops the dielectric ridges of the polarizer to the one surface of the Faraday rotator with the dielectric substrate of the polarizer spaced from the one surface of the Faraday rotator; and the method further includes removing at least a portion of the dielectric substrate of the polarizer; and/or (2) wherein step (c) includes coupling the tops the dielectric ridges of the analyzer to the opposing surface of the Faraday rotator with the dielectric substrate of the polarizer spaced from the opposing surface of the Faraday rotator; and removing at least a portion of the dielectric substrate of the analyzer.

Clause 45: The method of clause 43 or 44, further including coupling a wave plate to the dielectric ridges of the analyzer via a remainder of the dielectric substrate of the analyzer that was removed in step (2).

Clause 46: The method of any one of clauses 43-45, including at least one of: (1) step (b) includes coupling the dielectric ridges of the polarizer to the one surface of the Faraday rotator via the dielectric substrate of the polarizer; and/or (2) step (c) includes coupling the dielectric ridges of the analyzer to the opposing surface of the Faraday rotator via the dielectric substrate of the polarizer.

Clause 47: The method of any one of clauses 43-46, wherein the wave plate is a half ($\lambda$/2) wave plate.

Clause 48: The method of any one of clauses 43-47, wherein the wave plate has a fast axis oriented at 22.5° with respect to a polarization axis of the analyzer.

Clause 49: The method of any one of clauses 43-48, wherein the Faraday rotator is a garnet, such as, for example, without limitation, a bismuth iron garnet, a terbium gallium garnet, or an yttrium iron garnet.

Clause 50: The method of any one of clauses 43-49, wherein, at least one of: the coupling of step (b) is via a first adhesive or via a first substrate; and the coupling of step (c) is via a second adhesive or via a second substrate, wherein the first and second adhesives are the same or different.

Clause 51: The method of any one of clauses 43-50, wherein at least one of the first and second adhesives is an index matching epoxy.

Clause 52: The method of any one of clauses 43-51, wherein at least one of the first and second dielectric substrates comprises one or more layers.

Clause 53: The method of any one of clauses 43-52, wherein at least one of the one or more layers comprises silicon dioxide (SiO₂).

Clause 54: An optical isolator comprising a Faraday rotator and an optical polarizer coupled a surface of the Faraday rotator, wherein the optical polarizer comprises: a plurality of spaced elongated dielectric ridges coupled to the surface of the Faraday rotator; each dielectric ridge has a length direction that extends along the surface of the Faraday rotator; each dielectric ridge includes a pair of spaced sides that extend away from the surface of the Faraday rotator and a top extending between the spaced sides that is directly coupled to the one surface of the Faraday rotator; and each dielectric ridge includes an electrically conductive coating on each side of the dielectric ridge. In an example, the electrically conductive coating on each side of each dielectric ridge may comprise one or more of aluminum (Al), copper (Cu), Silver (Si), gold (Au), platinum (Pt), palladium (Pd), iridium (Ir), osmium (Os), rhodium (Rh), and ruthenium (Ru), or an alloy or amalgamation thereof.

Clause 55: The optical isolator of clause 54, further including another optical polarizer coupled an opposing surface of the Faraday rotator.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. An optical isolator comprising;
a polarizer, having a first polarization axis, for directly receiving an optical signal from an optical signal source and for outputting at least a part of the optical signal;
a Faraday rotator for directly receiving and for rotating a polarization of the at least part of the optical signal output by the polarizer, and for outputting at least a part thereof as a rotator output optical signal; and
an analyzer, having a second polarization axis, for directly receiving the rotator output optical signal and for outputting at least a part thereof, wherein:
the polarizer and the analyzer are coupled to first and second opposed surfaces of the Faraday rotator; and
each of the polarizer and the analyzer comprise:
a multi-layer dielectric substrate;
a plurality of elongated dielectric ridges positioned or disposed in spaced relation to each other in contact with a surface of the multi-layer dielectric substrate, wherein each dielectric ridge has a length direction that extends along the surface of the multi-layer dielectric substrate and each dielectric ridge includes a pair of spaced sides that extend away from the surface of the multi-layer dielectric substrate and a top extending between the spaced sides opposite the surface of the multi-layer dielectric substrate;
an electrically conductive coating on each side of each dielectric ridge;

a groove or trench between the electrically conductive coatings on facing sides of adjacent or proximate pairs of dielectric ridges; and
a solid dielectric in each groove or trench between the facing sides of the adjacent or proximate pairs of dielectric ridges, wherein said solid dielectric also covers the tops of the plurality of dielectric ridges, wherein:
the plurality of dielectric ridges of the polarizer are coupled to the first surface of the Faraday rotator via the multi-layer dielectric substrate of the polarizer with the solid dielectric that also covers the tops of the plurality of dielectric ridges of the polarizer disposed on a side of the polarizer opposite the multi-layer dielectric substrate of the polarizer; and
the plurality of dielectric ridges of the analyzer are coupled to the second surface of the Faraday rotator via the multi-layer dielectric substrate of the analyzer with the solid dielectric that also covers the tops of the plurality of dielectric ridges of the analyzer disposed on a side of the analyzer opposite the multi-layer dielectric substrate of the polarizer.

2. The optical isolator of claim 1, wherein the Faraday rotator is a garnet.

3. The optical isolator of claim 1, wherein the multi-layer dielectric substrate comprises one layer of silicon dioxide (SiO₂).

4. The optical isolator of claim 1, wherein the electrically conductive coating on each side of each dielectric ridge comprises aluminum (Al), copper (Cu), Silver (Ag), gold (Au), platinum (Pt), palladium (Pd), iridium (Ir), osmium (Os), rhodium (Rh), ruthenium (Ru), or an alloy or amalgamation thereof.

5. The optical isolator of claim 1, wherein the dielectric ridges are formed of SiO₂.

6. The optical isolator of claim 1, wherein the multi-layer dielectric substrate of at least one of the polarizer and the analyzer comprises:
a layer of fused silica (FS);
a layer of tantalum pentoxide (Ta2O5) between the layer of fused silica (FS) and the plurality of conductive ridges; and
a layer of magnesium fluoride (MgF2) between the layer of tantalum pentoxide (Ta2O5) and the plurality of conductive ridges.

7. The optical isolator of claim 1, wherein the multi-layer dielectric substrate of at least one of the polarizer and the analyzer comprises:
a bottom layer of silicon dioxide (SiO₂);
a layer of zinc selenide (ZnSe) between the bottom layer of silicon dioxide (SiO₂) and the plurality of conductive ridges;
an intermediate layer of silicon dioxide (SiO₂) between the layer of zinc selenide (ZnSe) and the plurality of conductive ridges; and
a top layer of zinc sulfide (ZnS) between the intermediate layer of silicon dioxide (SiO₂) and the plurality of conductive ridges.

8. The optical isolator of claim 1, wherein the solid dielectric material is epoxy or SiO2.

9. An optical isolator comprising;
a Faraday rotator; and
an optical polarizer coupled a surface of the Faraday rotator, wherein the optical polarizer comprises:
a multi-layer dielectric substrate coupled to the Faraday rotator;

a plurality of elongated dielectric ridges positioned or disposed in spaced relation to each other in contact with a surface of the multi-layer dielectric substrate opposite the Faraday rotator, wherein each dielectric ridge has a length direction that extends along the surface of the multi-layer dielectric substrate and each dielectric ridge includes a pair of spaced sides that extend away from the surface of the multi-layer dielectric substrate and a top extending between the spaced sides opposite the surface of the multi-layer dielectric substrate;

an electrically conductive coating on each side of each dielectric ridge;

a groove or trench between the electrically conductive coatings on facing sides of adjacent or proximate pairs of dielectric ridges; and a solid dielectric in each groove or trench between the facing sides of the adjacent or proximate pairs of dielectric ridges, wherein said solid dielectric also covers the tops of the plurality of dielectric ridges.

10. The optical isolator of claim 9, further including another optical polarizer coupled to an opposing surface of the Faraday rotator.

11. The optical isolator of claim 9, wherein the electrically conductive coating on each side of each dielectric ridge comprises aluminum (Al), copper (Cu), Silver (Ag), gold (Au), platinum (Pt), palladium (Pd), iridium (Ir), osmium (Os), rhodium (Rh), ruthenium (Ru), or an alloy or amalgamation thereof.

12. The optical isolator of claim 9, wherein the dielectric ridges are formed of $SiO_2$.

13. The optical isolator of claim 9, wherein the multi-layer dielectric substrate comprises:

a layer of fused silica (FS);

a layer of tantalum pentoxide (Ta2O5) between the layer of fused silica (FS) and the plurality of conductive ridges; and a layer of magnesium fluoride (MgF2) between the layer of tantalum pentoxide (Ta2O5) and the plurality of conductive ridges.

14. The optical isolator of claim 9, wherein the multi-layer dielectric substrate comprises:

a bottom layer of silicon dioxide ($SiO_2$);

a layer of zinc selenide (ZnSe) between the bottom layer of silicon dioxide ($SiO_2$) and the plurality of conductive ridges;

an intermediate layer of silicon dioxide ($SiO_2$) between the layer of zinc selenide (ZnSe) and the plurality of conductive ridges; and a top layer of zinc sulfide (ZnS) between the intermediate layer of silicon dioxide ($SiO_2$) and the plurality of conductive ridges.

15. The optical isolator of claim 9, wherein the solid dielectric material is epoxy or SiO2.

* * * * *